US011483552B2

(12) United States Patent
Liu et al.

(10) Patent No.: US 11,483,552 B2
(45) Date of Patent: Oct. 25, 2022

(54) HALF-PEL INTERPOLATION FILTER IN INTER CODING MODE

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/484,509

(22) Filed: Sep. 24, 2021

(65) Prior Publication Data
US 2022/0014790 A1    Jan. 13, 2022

Related U.S. Application Data

(63) Continuation of application No. PCT/CN2020/082754, filed on Apr. 1, 2020.

(30) Foreign Application Priority Data

Apr. 1, 2019   (WO) ................ PCT/CN2019/080754

(51) Int. Cl.
*H04N 19/105*   (2014.01)
*H04N 19/117*   (2014.01)
(Continued)

(52) U.S. Cl.
CPC ......... *H04N 19/105* (2014.11); *H04N 19/117* (2014.11); *H04N 19/132* (2014.11);
(Continued)

(58) Field of Classification Search
CPC ............................ H04N 19/80; H04N 19/517
See application file for complete search history.

(56) References Cited

U.S. PATENT DOCUMENTS 9,241,160 B2   1/2016  He et al.
9,762,925 B2   9/2017  Fu et al.
(Continued)

FOREIGN PATENT DOCUMENTS

CN   102084655 A   6/2011
CN   102172022 A   8/2011
(Continued)

OTHER PUBLICATIONS

Li Zahng et. al. "CE4: History-based Motion Vector Prediction". Joint Video Experts Team (.JVET)of ITU-T SG 16 WP 3 and ISO/IEC JTC 1/SC 29/WG 11 12th Meeting: Macao, CN, Oct. 3-12, 2018.*

(Continued)

*Primary Examiner* — Mohammed S Rahaman
(74) *Attorney, Agent, or Firm* — Perkins Coie LLP

(57) ABSTRACT

A method of video processing is provided to include: performing a conversion between a current video block of a video and a coded representation of the video, wherein the coded representation includes a first parameter that indicates a motion information precision from a multiple precision set for the current video block that does not use a default motion information precision and/or a second parameter which identifies whether an alternative half-pel interpolation filter is used for the conversion, and wherein each of the first parameter and/or the second parameter is associated with one or more bins and a context-model based coding is only used for a first bin of the one or more bins in the coded representation.

20 Claims, 27 Drawing Sheets

(51) Int. Cl.
*H04N 19/132* (2014.01)
*H04N 19/176* (2014.01)
*H04N 19/80* (2014.01)
*H04N 19/52* (2014.01)
*H04N 19/523* (2014.01)
*H04N 19/517* (2014.01)

(52) U.S. Cl.
CPC ......... *H04N 19/176* (2014.11); *H04N 19/517* (2014.11); *H04N 19/52* (2014.11); *H04N 19/523* (2014.11); *H04N 19/80* (2014.11)

(56) References Cited

U.S. PATENT DOCUMENTS

| | | | |
|---|---|---|---|
| 9,912,925 | B2 | 3/2018 | Ye et al. |
| 9,924,191 | B2 | 3/2018 | Chen et al. |
| 10,306,240 | B2 | 5/2019 | Xiu et al. |
| 10,341,659 | B2 | 7/2019 | Lee et al. |
| 10,382,781 | B2 | 8/2019 | Zhao et al. |
| 10,440,340 | B2 | 10/2019 | Ye et al. |
| 10,904,565 | B2 | 1/2021 | Chuang et al. |
| 11,323,697 | B2 | 5/2022 | Liu et al. |
| 2010/0002770 | A1 | 1/2010 | Motta et al. |
| 2010/0104214 | A1 | 4/2010 | Tamburrino et al. |
| 2010/0111182 | A1 | 5/2010 | Karczewicz et al. |
| 2011/0080953 | A1 | 4/2011 | Francois et al. |
| 2011/0085742 | A1 | 4/2011 | Maurer |
| 2011/0116546 | A1 | 5/2011 | Guo et al. |
| 2011/0200111 | A1 | 8/2011 | Chen et al. |
| 2012/0147963 | A1 | 6/2012 | Sato |
| 2012/0183068 | A1 | 7/2012 | Lou et al. |
| 2013/0034157 | A1* | 2/2013 | Helle ............... H04N 19/159 375/240.12 |
| 2013/0336383 | A1* | 12/2013 | Xu ............... H04N 19/82 375/240.02 |
| 2013/0343460 | A1 | 12/2013 | Itani et al. |
| 2014/0269926 | A1 | 9/2014 | Oh et al. |
| 2014/0307787 | A1 | 10/2014 | Zheng et al. |
| 2015/0189298 | A1 | 7/2015 | Ye et al. |
| 2015/0229953 | A1 | 8/2015 | Oh et al. |
| 2016/0057420 | A1 | 2/2016 | Pang et al. |
| 2016/0057431 | A1 | 2/2016 | El Chami et al. |
| 2016/0080771 | A1 | 3/2016 | Cehn et al. |
| 2016/0373743 | A1 | 12/2016 | Zhao et al. |
| 2017/0310961 | A1 | 10/2017 | Liu et al. |
| 2018/0077423 | A1 | 3/2018 | Xu et al. |
| 2018/0091816 | A1* | 3/2018 | Chien ............... H04N 19/70 |
| 2018/0098066 | A1 | 4/2018 | Lee et al. |
| 2018/0131932 | A1 | 5/2018 | Lin et al. |
| 2018/0199057 | A1 | 7/2018 | Chuang et al. |
| 2018/0270485 | A1* | 9/2018 | Jang ............... H04N 19/176 |
| 2018/0288410 | A1 | 10/2018 | Park et al. |
| 2018/0376166 | A1 | 12/2018 | Chuang et al. |
| 2019/0238864 | A1 | 8/2019 | Xiu et al. |
| 2019/0379870 | A1 | 12/2019 | Ye et al. |
| 2020/0059658 | A1 | 2/2020 | Chien et al. |
| 2020/0099951 | A1 | 3/2020 | Hung et al. |
| 2020/0128250 | A1* | 4/2020 | Lee ............... H04N 19/176 |
| 2020/0396445 | A1 | 12/2020 | Seregin et al. |
| 2020/0404342 | A1 | 12/2020 | Kotra et al. |
| 2021/0014478 | A1 | 1/2021 | Seregin et al. |
| 2021/0044824 | A1* | 2/2021 | Li ............... H04N 19/523 |
| 2021/0092425 | A1 | 3/2021 | Li et al. |
| 2021/0243470 | A1* | 8/2021 | Solovyev ............... H04N 19/573 |
| 2021/0250592 | A1 | 8/2021 | Xiu et al. |
| 2021/0258569 | A1 | 8/2021 | Chen et al. |
| 2021/0274175 | A1* | 9/2021 | Lim ............... H04N 19/96 |
| 2021/0281852 | A1 | 9/2021 | Alshina et al. |
| 2021/0360228 | A1 | 11/2021 | Kotra et al. |
| 2021/0409702 | A1 | 12/2021 | Wang et al. |
| 2022/0007059 | A1 | 1/2022 | Deng et al. |
| 2022/0014734 | A1 | 1/2022 | Liu et al. |
| 2022/0014791 | A1 | 1/2022 | Liu et al. |
| 2022/0132111 | A1 | 2/2022 | Liu et al. |

FOREIGN PATENT DOCUMENTS

| | | |
|---|---|---|
| CN | 102461150 A | 5/2012 |
| CN | 102572278 A | 7/2012 |
| CN | 104869400 A | 8/2015 |
| CN | 105075263 A | 11/2015 |
| CN | 105723676 A | 6/2016 |
| CN | 105900425 A | 8/2016 |
| CN | 106331722 A | 1/2017 |
| CN | 106464863 A | 2/2017 |
| CN | 107787582 A | 3/2018 |
| CN | 108293111 A | 7/2018 |
| CN | 108353176 A | 7/2018 |
| CN | 108353184 A | 7/2018 |
| EP | 2768221 A1 | 8/2014 |
| EP | 3997873 A1 | 5/2022 |
| JP | 2000059766 A | 2/2000 |
| WO | 2008148272 A1 | 12/2008 |
| WO | 2015106126 A1 | 7/2015 |
| WO | 2015113510 A1 | 8/2015 |
| WO | 2016109309 A2 | 7/2016 |
| WO | 2017180203 A1 | 10/2017 |
| WO | 2018012933 A1 | 1/2018 |
| WO | 2018205914 A1 | 11/2018 |
| WO | 2018205954 A1 | 11/2018 |

OTHER PUBLICATIONS

D. Marpe, H. Schwarz and T. Wiegand, "Context-based adaptive binary arithmetic coding in the H.264/AVC video compression standard," in IEEE Transactions on Circuits and Systems for Video Technology, vol. 13, No. 7, pp. 620-636, Jul. 2003, doi: 10.1109/TCSVT.2003.815173.*

Bross et al. ""Versatile Video Coding (Draft 6),"" Joint Video Experts Team (JVET)of ITU-T SG 16 WP 3 and ISO/IEC JTC 1/SC 29/WG 11 5th Meeting: Gothenburg, SE, Jul. 3-12, 2019, document JVET-O2001, 2019.

Bross et al. ""Versatile Video Coding (Draft 4),"" Joint Video Experts Team (JVET)of ITU-T SG 16 WP 3 and ISO/IEC JTC 1/SC 29/WG 11 13th Meeting: Marrakech, MA, Jan. 9-18, 2019, document JVET-M1001, 2019.

Henkel et al. ""Non-CE4: Switched Half-Pel Interpolation Filter,"" Joint Video Experts Team (JVET)of ITU-T SG 16 WP 3 and ISO/IEC JTC 1/SC 29/WG 11 14th Meeting: Geneva, CH, Mar. 19-27, 2019, document JVET-N0309, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Liu et al. Non-CE4: Cleanup of Half-Pel Switchable Interpolation Filter, Joint Video Experts Team (JVET)of ITU-T SG 16 WP 3 and ISO/IEC JTC 1/SC 29/WG 11 16th Meeting: Geneva, CH, Oct. 1-11, 2019, document JVET-P0490, 2019.

Park et al. ""CE4-3.3 : Candidates optimization on MMVD,"" Joint Video Experts Team (JVET)of ITU-T SG 16 WP 3 and ISO/IEC JTC 1/SC 29/WG 11 14th Meeting: Geneva, CH, Mar. 19-27, 2019, document JVET-N0441, 2019.

Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.

International Search Report and Written Opinion from International Patent Application No. PCT/CN2020/082744 dated Jun. 30, 2020 (10 pages).

International Search Report and Written Opinion from International Patent Application No. PCT/CN2020/082747 dated Jun. 30, 2020 (12 pages).

International Search Report and Written Opinion from International Patent Application No. PCT/CN2020/082752 dated Jun. 22, 2020 (10 pages).

International Search Report and Written Opinion from International Patent Application No. PCT/CN2020/082753 dated Jun. 28, 2020 (11 pages).

(56) References Cited

OTHER PUBLICATIONS

International Search Report and Written Opinion from International Patent Application No. PCT/CN2020/082754 dated Jul. 2, 2020 (10 pages).
International Search Report and Written Opinion from International Patent Application No. PCT/CN2020/110147 dated Nov. 23, 2020 (10 pages).
Non Final Office Action from U.S. Appl. No. 17/484,565 dated Nov. 29, 2021.
Notice of Allowance from U.S. Appl. No. 17/484,636 dated Jan. 20, 2022.
Chen et al. "Algorithm Description for Versatile Video Coding and Test Model 3 (VTM 3)," Joint Video Experts Team (JVET) of ITU-T SG 16 WP 3 and ISO/IEC JTC 1/SC 29/WG 11, 12th Meeting Macao, CN, Oct. 3-12, 2018, document JVET-L1002, 2018.
Chen et al. "Algorithm Description for Versatile Video Coding and Test Model 4 (VTM 4)," Joint Video Experts Team (JVET) of ITU-T SG 16 WP 3 and ISO/IEC JTC 1/SC 29/WG 11, 13th Meeting Marrakech, MA, Jan. 9-18, 2019, document JVET-M1002, 2019.
"Decoding +(reference picture resampling) And (filter interpolation)" Google Search Mar. 12, 2022.
"Reference, Picture" Library USPTO Query, Mar. 12, 2022.
Notice of Allowance from U.S. Appl. No. 17/484,565 dated Mar. 16, 2022.
Non Final Office Action from U.S. Appl. No. 17/568,471 dated Mar. 17, 2022.
Chen et al. "Comparative Study of Video Coding Solutions VVC, AV1, EVC, Versus HEVC," 126 Motion Picture Experts Group or ISO/IEC JTC 1/SC 29/WG 11, MPEG Meeting, Mar. 25-26, 2019, Geneva, No. m47482, document JVET-N0605, 2019.
Extended European Search Report from European Patent Application No. 20782257.8 dated May 6, 2022 (11 pages).
Non Final Office Action from U.S. Appl. No. 17/484,565 dated Jul. 15, 2022.
Choi et al. "AHG8: Signaling and Filtering for Referene Picture Resampling," Joint Video Experts Team (JVET) of ITU-T SG 16 WP 3 and ISO/IEC JTC 1/SC 29/WG 11 15th Meeting, Gothenburg, SE Jul. 3-12, 2019, document JVET-O30332, 2019. (cited in EP20854091.4 EESR dated Aug. 12, 2022).
Extended European Search Report from European Patent Application No. 20854091.4 dated Aug. 12, 2022 (13 pages).

\* cited by examiner

Illustration of a QTBT structure

Derivation process for merge candidates list construction.

Positions of spatial merge candidates

Candidate pairs considered for redundancy check of spatial merge candidates second PU of Nx2Nsecond PU of 2NxN Positions for the second PU of N×2N and 2N×N partitions Illustration of motion vector scaling for temporal merge candidate Candidate positions for temporal merge candidate, C0 and C1

Example of combined bi-predictive merge candidate

*FIG. 8*

Derivation process for motion vector prediction candidates

Illustration of motion vector scaling for spatial motion vector candidate

HALF-PEL INTERPOLATION FILTER IN INTER CODING MODE

CROSS REFERENCE TO RELATED APPLICATIONS

This application is a continuation of International Application No. PCT/CN2020/082754, filed on Apr. 1, 2020, which claims the priority to and benefit of International Patent Application No. PCT/CN2019/080754, filed on Apr. 1, 2019. All the aforementioned patent applications are hereby incorporated by reference in their entireties.

TECHNICAL FIELD

This patent document relates to video processing techniques, devices and systems.

BACKGROUND

In spite of the advances in video compression, digital video still accounts for the largest bandwidth use on the Internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to deriving motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes performing a conversion between a current video block of a video and a coded representation of the video, wherein the coded representation includes a first parameter that indicates a motion information precision from a multiple precision set for the current video block that does not use a default motion information precision and/or a second parameter which identifies whether an alternative half-pel interpolation filter is used for the conversion, and wherein each of the first parameter and/or the second parameter is associated with one or more bins and a context-model based coding is only used for a first bin of the one or more bins in the coded representation.

In another aspect, the disclosed technology may be used to provide a method for video processing. This method includes determining, for a conversion between a current video block of a video and a coded representation of the video, motion information using an interpolation filter, the motion information having an M-integer pixel accuracy or a 1/N sub-pixel accuracy, where M and N are positive integers and N is unequal to 2; and performing the conversion based on the motion information; wherein a syntax field in the coded representation corresponds to the interpolation filter.

In another aspect, the disclosed technology may be used to provide a method for video processing. This method includes generating, for a conversion between a current video block of a video and a coded representation of the video, a first motion candidate based on one or more motion candidates in a motion candidate list and one or more interpolation filters associated with the one or more motion candidates; wherein an interpolation filter is assigned to the first motion candidate according to a rule that depends on the one or more interpolation filters associated with the one or more motion candidates; inserting the first motion candidate into the motion candidate list; and performing the conversion based on the motion candidate list In another aspect, the disclosed technology may be used to provide a method for video processing. This method includes associating, with each of multiple blocks comprising a first block in a first video region and a second block in a second video region of a video, motion information that includes information about a respective interpolation filter used for interpolating motion vector difference information for each of the multiple blocks; and performing a conversion between the video and a coded representation of the video using the motion information.

In another aspect, the disclosed technology may be used to provide a method for video processing. This method includes performing a conversion between a current video block of a video and a coded representation of the video, wherein the current video block is represented in the coded representation using a merge mode or a merge with motion vector different (MMVD) mode, wherein an interpolation filter having a 1/N precision is used for interpolating a prediction block associated with the current video block according to a rule, wherein N is a positive integer; wherein the rule defines a condition for inheriting interpolation information in case that the interpolation filter is an alternative interpolation filter that is different from a default interpolation filter.

In another aspect, the disclosed technology may be used to provide a method for video processing. This method includes processing a current video block during a conversion between a video comprising the current video block and a coded representation of the video; and comparing and selectively updating a merge candidate list with motion information of the current video block, wherein the motion information includes interpolation filter information; wherein the interpolation filter information includes parameters of an interpolation filter used for interpolating motion vector difference values used for representing the current video block in the coded representation.

In one representative aspect, the disclosed technology may be used to provide a method for video processing. This method includes maintaining, prior to a conversion between a current video block of a video region and a coded representation of the video, at least one history-based motion vector prediction (HMVP) table, wherein the HMVP table includes one or more entries corresponding to motion information of one or more previously processed blocks; and performing the conversion using the at least one HMVP table, and wherein the motion information of each entry is configured to include interpolation filter information for the one or more previously processed blocks, and wherein the interpolation filter information indicates interpolation filters used for interpolating prediction blocks of the one or more previously processed blocks.

In one representative aspect, the disclosed technology may be used to provide a method for video processing. This method includes maintaining, prior to a conversion between a current video block of a video region and a coded representation of the video, at least one history-based motion vector prediction (HMVP) table that includes one or more entries corresponding to motion information of one or more previously processed blocks, and wherein the motion information of each entry is configured to include interpolation filter information for the one or more previously processed blocks; constructing, for the conversion, a motion candidate list which includes an HMVP merge candidate, wherein the HMVP candidate is derived by inheriting one entry from the HMVP table including corresponding interpolation filter information associated with the one entry; and performing the conversion based on the motion candidate list.

In one representative aspect, the disclosed technology may be used to provide a method for video processing. This method includes deciding a coding mode used for representing a current video block of a video in a coded representation of the video; and coding the current video block into the coded representation according to the coding mode, wherein use of half-pel accuracy for representing motion information is disabled for the current video block due to use of the coding mode.

In one representative aspect, the disclosed technology may be used to provide a method for video processing. This method includes parsing a coded representation of a video to determine that a current video block of the video is coded using a coding mode; and generating a decoded representation of the current video block from the coded representation according to the coding mode, wherein use of half-pel accuracy for representing motion information is disabled for the current video block due to use of the coding mode.

In one representative aspect, the disclosed technology may be used to provide a method for video processing. This method includes determining, for a current video block that is processed using a generalized Bi-prediction (GBi) mode, to use a first weighting factor and a second, different weighting factor for a first prediction block and a second prediction block, respectively, the first weighting factor and the second weighting factor selected from weighting factor sets; and performing a conversion between the current video block of a video and a coded representation of the video based on the determining, wherein a first weighting factor set used for an inter mode is different from a second weighting factor set used for an affine inter mode.

In one representative aspect, the disclosed technology may be used to provide a method for video processing. This method includes determining, for a conversion between multiple video units of a video region of a video and a coded representation of the multiple video units, information related to an interpolation filter depending on a coding mode of a video unit, the interpolation filter used for interpolating motion vector difference values in the coded representation and having a M-integer pixel accuracy or a 1/N sub-pixel accuracy, where M and N are positive integers; and performing the conversion using the interpolation filter.

In one representative aspect, the disclosed technology may be used to provide a video encoding method. This method includes deciding a coding mode used for representing a current video block of a video in a coded representation of the video; and coding the current video block into the coded representation according to the coding mode, wherein use of alternative half-pel accuracy filters in addition to a default half-pel accuracy filter for representing motion information is disabled for the current video block due to use of the coding mode.

In one representative aspect, the disclosed technology may be used to provide a video decoding method. This method includes parsing a coded representation of a video to determine that a current video block of the video is coded using a coding mode; and generating a decoded representation of the current video block from the coded representation according to the coding mode, wherein use of alternative half-pel accuracy filters in addition to a default half-pel accuracy filter for representing motion information is disabled for the current video block due to use of the coding mode.

In one representative aspect, the disclosed technology may be used to provide a video encoding method. This method includes determining, due to use of an alternative interpolation filter being enabled for a video block of a video, that a coding mode is disallowed for coding the video block into a coded representation of the video; and generating the coded representation of the video block based on the determining, wherein the alternative interpolation filter is used for interpolating inter prediction blocks of the current video block.

In one representative aspect, the disclosed technology may be used to provide a video decoding method. This method includes determining, due to use of an alternative interpolation filter being enabled for a video block of a video, that use of a coding mode for representing the video block in a coded representation of the video is disallowed; and generating a decoded video block by parsing the coded representation based on the determining.

Further, in a representative aspect, any of the disclosed methods is an encoder-side implementation.

Also, in a representative aspect, any of the disclosed methods is a decoder-side implementation.

One of the above-described methods are embodied in the form of processor-executable code and stored in a computer-readable program medium.

In yet another representative aspect, an apparatus in a video system comprising a processor and a non-transitory memory with instructions thereon is disclosed. The instructions upon execution by the processor, cause the processor to implement any of the disclosed methods.

The above and other aspects and features of the disclosed technology are described in greater detail in the drawings, the description and the claims.

BRIEF DESCRIPTION OF THE DRAWINGS

FIG. 8 shows an example of creating a combined bi-predictive merge candidate.

DETAILED DESCRIPTION

1. Video coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Quadtree Plus Binary Tree (QTBT) Block Structure with Larger CTUs

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

Figure 1:
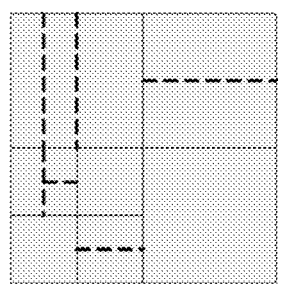
FIG. 1 shows an illustration of a Quadtree plus binary tree (QTBT) block structure.
Figure 1:
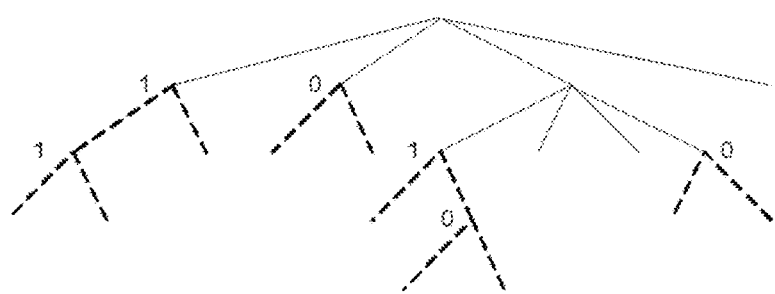

FIG. 1 shows an illustration of a Quadtree plus binary tree (QTBT) block structure. The QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 1, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

- CTU size: the root node size of a quadtree, the same concept as in HEVC
- MinQTSize: the minimum allowed quadtree leaf node size
- MaxBTSize: the maximum allowed binary tree root node size
- MaxBTDepth: the maximum allowed binary tree depth
- MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 1 (left) illustrates an example of block partitioning by using QTBT, and FIG. 1 (right) illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.2. Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2.1. Merge Mode
2.2.1.1. Derivation of Candidates for Merge Mode

Figure 2:
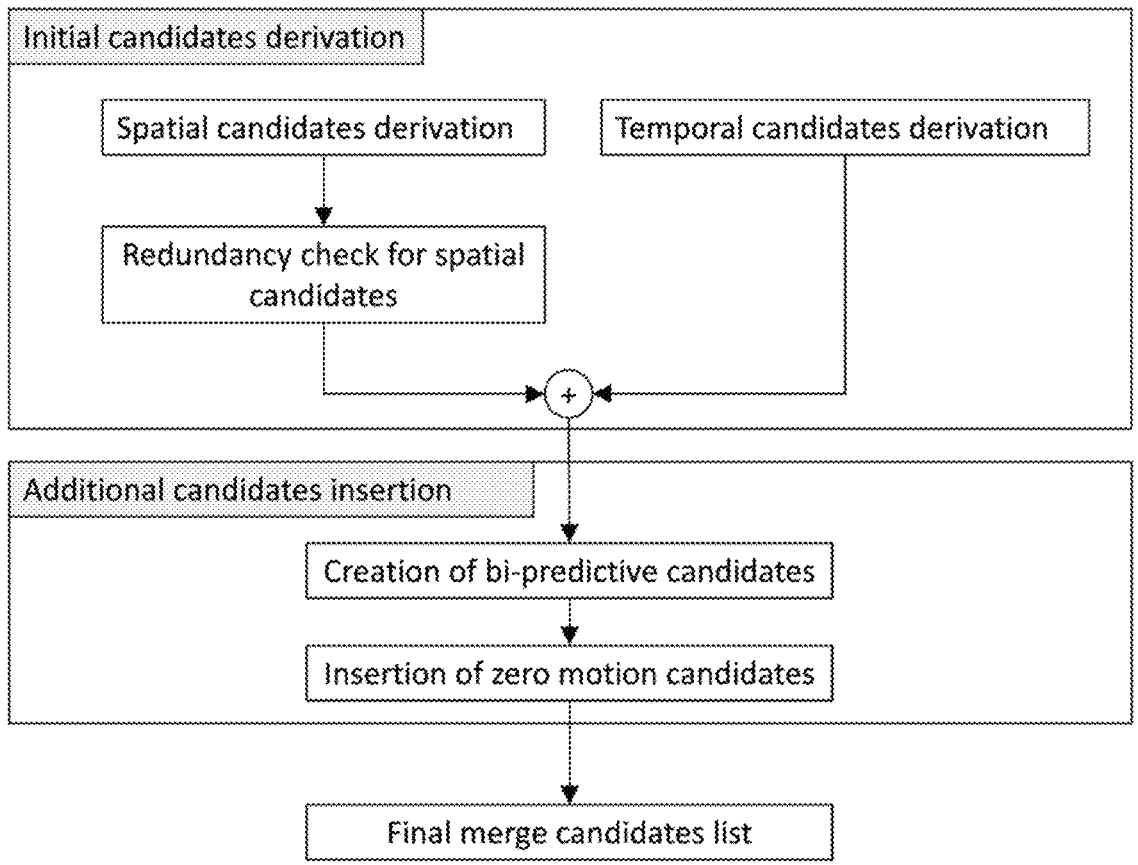
FIG. 2 shows an example of constructing a merge candidate list.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 2. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.2.1.2. Spatial Candidates Derivation

Figure 3:
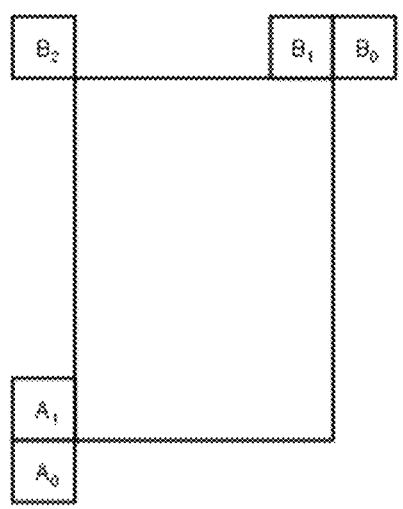
FIG. 3 shows an example of positions of spatial candidates.
Figure 4:
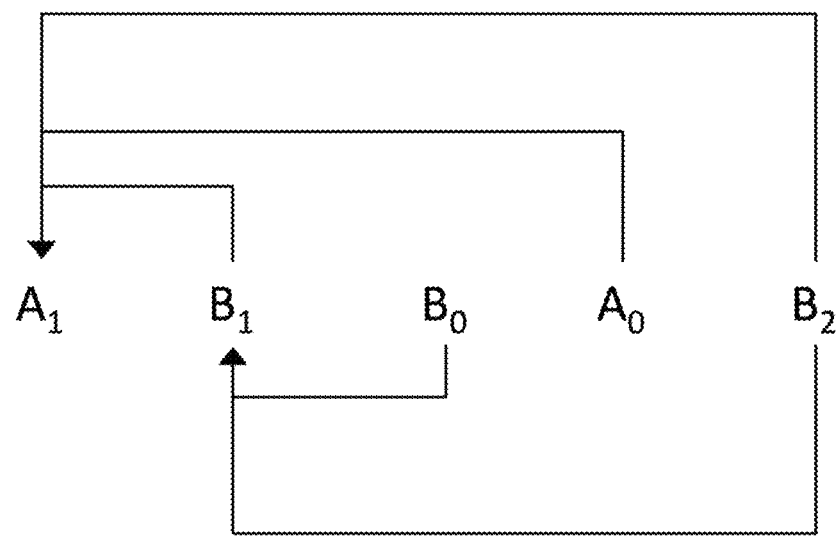
FIG. 4 shows an example of candidate pairs subject to a redundancy check of spatial merge candidates.
Figure 5A:
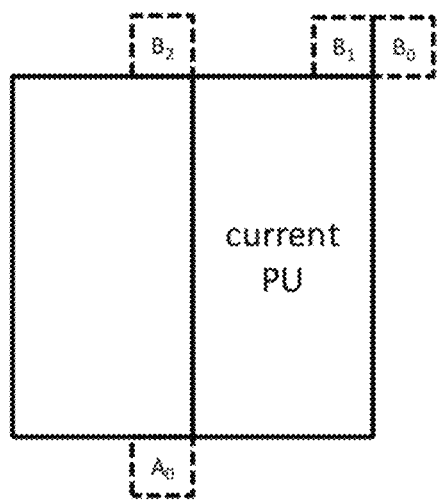
FIGS. 5A and 5B show examples of the position of a second prediction unit (PU) based on the size and shape of the current block.
Figure 5B:
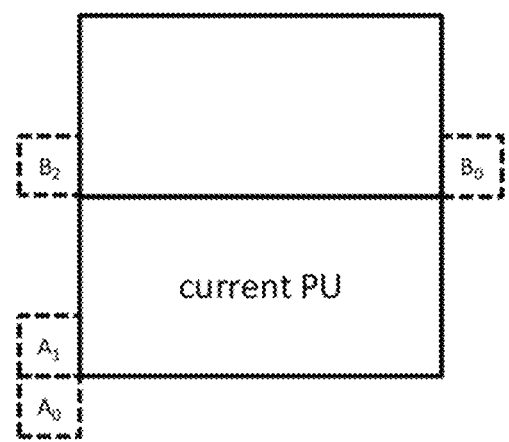

In the derivation of spatial merge candidates, a maximum of four merge candidates are selected among candidates located in the positions depicted in FIG. 3. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 4 are considered and a candidate is only added to the list if the corresponding candidate used for redundancy check has not the same motion information. Another source of duplicate motion information is the "second PU" associated with partitions different from 2N×2N. As an example, FIG. 5 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.2.1.3. Temporal Candidates Derivation

Figure 6:
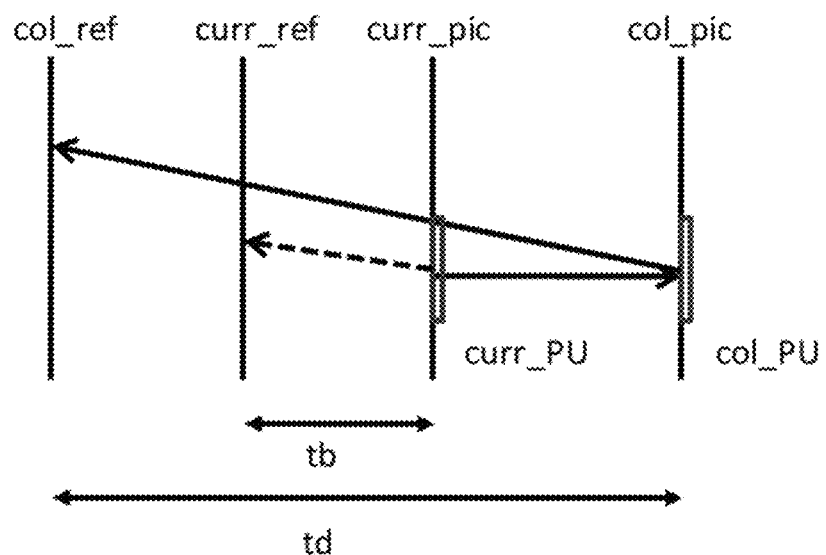
FIG. 6 shows an example of motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 6, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 7:
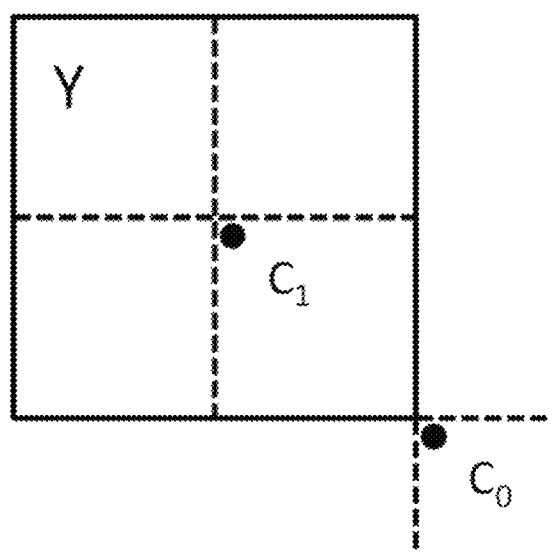
FIG. 7 shows an example of candidate positions for temporal merge candidates.

In the co-located PU (Y) belonging to the reference frame, the position for the temporal candidate is selected between candidates $C_0$ and $C_1$, as depicted in FIG. 7. If PU at position $C_0$ is not available, is intra coded, or is outside of the current CTU row, position $C_1$ is used. Otherwise, position $C_0$ is used in the derivation of the temporal merge candidate.

2.2.1.4. Additional Candidates Insertion

Figure 8:
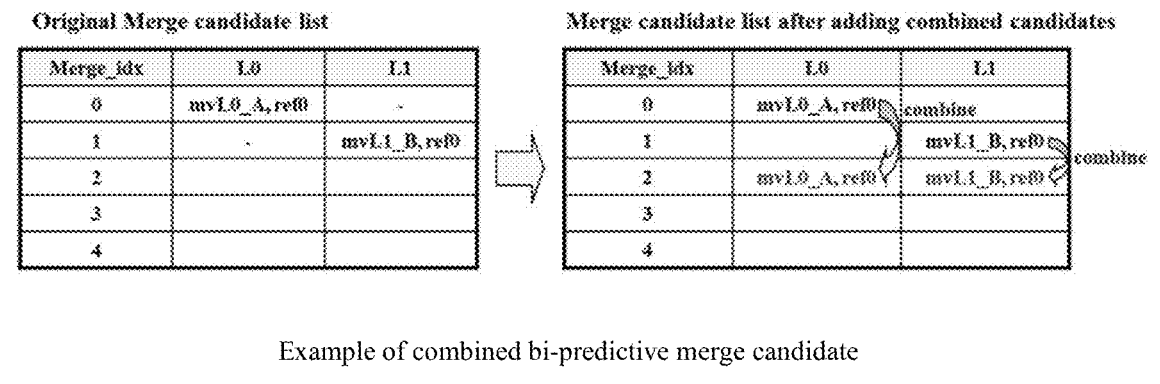

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 8 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.2.1.5. Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.2.2. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 9). In the following sections, details about derivation process of motion vector prediction candidate are provided.

2.2.2.1. Derivation of AMVP Candidates

Figure 9:
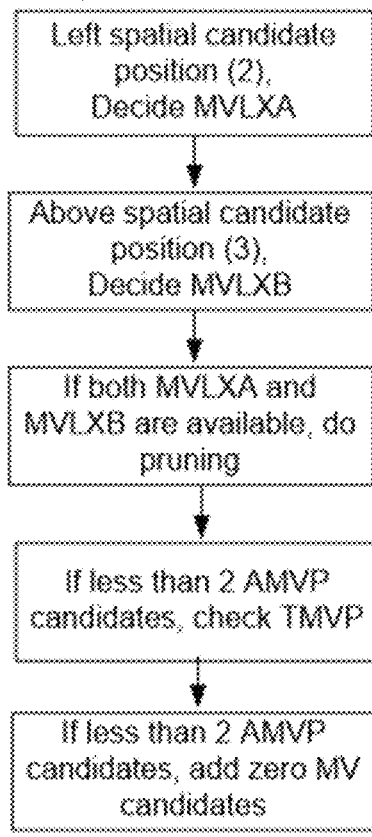
FIG. 9 shows an example of constructing motion vector prediction candidates.

FIG. 9 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 3.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2.2. Spatial Motion Vector Candidates

In the derivation of spatial motion vector candidates, a maximum of two candidates are considered among five potential candidates, which are derived from PUs located in positions as depicted in FIG. 3, those positions being the same as those of motion merge. The order of derivation for the left side of the current PU is defined as $A_0, A_1$, and scaled $A_0$, scaled $A_1$. The order of derivation for the above side of the current PU is defined as $B_0, B_1, B_2$, scaled $B_0$, scaled $B_1$, scaled $B_2$. For each side there can be four cases used as motion vector candidates, with two cases not associated with spatial scaling, and two cases where spatial scaling is used. The four different cases are summarized as follows.

No spatial scaling
 (1) Same reference picture list, and same reference picture index (same POC)
 (2) Different reference picture list, but same reference picture (same POC)

Spatial scaling
 (3) Same reference picture list, but different reference picture (different POC)
 (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 10:
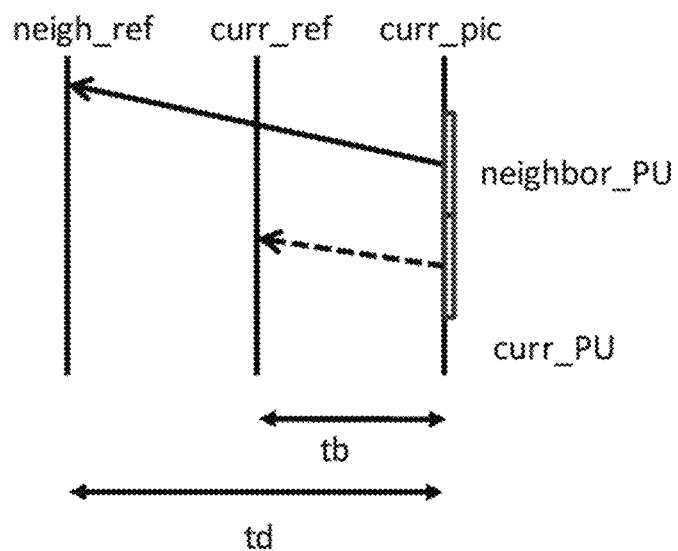
FIG. 10 shows an example of motion vector scaling for spatial motion vector candidates.

In a spatial scaling process, the motion vector of the neighbouring PU is scaled in a similar manner as for temporal scaling, as depicted as FIG. 10. The main difference is that the reference picture list and index of current PU is given as input; the actual scaling process is the same as that of temporal scaling.

2.2.2.3. Temporal Motion Vector Candidates

Apart for the reference picture index derivation, all processes for the derivation of temporal merge candidates are the same as for the derivation of spatial motion vector candidates (see FIG. 7). The reference picture index is signalled to the decoder.

2.3. Adaptive Motion Vector Difference Resolution (AMVR)

In VVC, for regular inter mode, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.4. Interpolation Filters in VVC

For the luma interpolation filtering, 8-tap separable interpolation filters are used for 1/16-pel precision samples, as shown in Table 1.

For the vertical interpolation for 4:2:2 and the horizontal and vertical interpolation for 4:4:4 chroma channels, the odd positions in Table 2 are not used, resulting in 1/16-pel chroma interpolation.

TABLE 1

8-tap coefficients $f_L$ for 1/16-pel luma interpolation.

| Fractional sample position p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Similarly, 4-tap separable interpolation filters are used for the 1/32-pel precisions chroma interpolation, as shown in Table 2.

TABLE 2

4-tap interpolation coefficients $f_C$ for 1/32-pel chroma interpolation.

| Fractional sample position p | $f_C[p][0]$ | $f_C[p][1]$ | $f_C[p][2]$ | $f_C[p][3]$ |
|---|---|---|---|---|
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

2.5. Alternative Luma Half-Pel Interpolation Filters

In JVET-N0309, alternative half-pel interpolation filters are proposed.

The switching of the half-pel luma interpolation filter is done depending on the motion vector accuracy. In addition to the existing quarter-pel, full-pel, and 4-pel AMVR modes, a new half-pel accuracy AMVR mode is introduced. Only in case of half-pel motion vector accuracy, an alternative half-pel luma interpolation filter can be selected.

2.5.1. Half-Pel AMVR Mode

An additional AMVR mode for non-affine non-merge inter-coded CUs is proposed which allows signaling of motion vector differences at half-pel accuracy. The existing AMVR scheme of the current VVC draft is extended straightforward in the following way: Directly following the syntax element amvr_flag, if amvr_flag==1, there is a new context-modeled binary syntax element hpel_amvr_flag which indicates usage of the new half-pel AMVR mode if hpel_amvr_flag==1. Otherwise, i.e. if hpel_amvr_flag==0, the selection between full-pel and 4-pel AMVR mode is indicated by the syntax element amvr_precision_flag as in the current VVC draft.

2.5.2. Alternative Luma Half-Pel Interpolation Filters

For a non-affine non-merge inter-coded CU which uses half-pel motion vector accuracy (i.e., the half-pel AMVR mode), a switching between the HEVC/VVC half-pel luma interpolation filter and one or more alternative half-pel interpolation is made based on the value of a new syntax element if_idx. The syntax element if_idx is only signaled in case of half-pel AMVR mode. In case of skip/merge mode using a spatial merging candidate, the value of the syntax element if_idx is inherited from the neighbouring block.

2.5.2.1. Test 1: One Alternative Half-Pel Interpolation Filter

In this test case, there is one 6-tap interpolation filter as an alternative to the ordinary HEVC/VVC half-pel interpolation filter. The following table shows the mapping between the value of the syntax element if_idx and the selected half-pel luma interpolation filter:

| if_idx | Binarization | Filter | Interpolation filter coefficients |
|---|---|---|---|
| 0 | 0 | Gauss (6-tap) | [0, 3, 9, 20, 20, 9, 3, 0] |
| 1 | 1 | HEVC/VVC (8-tap) | [−1, 4, −11, 40, 40, −11, 4, −1] |

2.5.2.2. Test 2: Two Alternative Half-Pel Interpolation Filters

In this test case, there are two 8-tap interpolation filters as an alternative to the ordinary HEVC/VVC half-pel interpolation filter. The following table shows the mapping between the value of the syntax element if_idx and the selected half-pel luma interpolation filter:

| if_idx | Binarization | Filter | Interpolation filter coefficients |
|---|---|---|---|
| 0 | 0 | Filter 1 (8-tap) | [3, 6, 10, 13, 13, 10, 6, 3] |
| 1 | 10 | Filter 2 (8-tap) | [−1, −1, 9, 25, 25, 9, −1, −1] |
| 2 | 11 | HEVC/VVC (8-tap) | [−1, 4, −11, 40, 40, −11, 4, −1] | amvr_precision_idx is signaled to indicate whether the current CU employs ½-pel, 1-pel or 4-pel MV preicision. There are 2 bins to be coded.

hpel_if_idx is signaled to indicate whether the default half-pel interpolation filter or alternative half-pel interpolation filters are used. When 2 alternative half-pel interpolation filters are used, there are 2 bins to be coded.

2.6. Generalized Bi-Prediction

In conventional bi-prediction, the predictors from L0 and L1 are averaged to generate the final predictor using the equal weight 0.5. The predictor generation formula is shown as in Equ. (3)

$$P_{TraditionalBiPred} = (P_{L0} + P_{L1} + \text{RoundingOffset}) \gg \text{shiftNum}, \quad (1)$$

In Equ. (3), $P_{TraditonalBiPred}$ is the final predictor for the conventional bi-prediction, $P_{L0}$ and $P_{L1}$ are predictors from L0 and L1, respectively, and RoundingOffset and shiftNum are used to normalize the final predictor.

Generalized Bi-prediction (GBI) is proposed to allow applying different weights to predictors from L0 and L1. The predictor generation is shown in Equ. (4).

$$P_{GBi} = ((1-w_1)*P_{L0} + w_1*P_{L1} + \text{RoundingOffset}_{GBi}) \gg \text{shiftNum}_{GBi}, \quad (2)$$

In Equ. (4), $P_{GBi}$ is the final predictor of GBi. $(1-w_1)$ and $w_1$ are the selected GBI weights applied to the predictors of L0 and L1, respectively. RoundingOffset$_{GBi}$ and shiftNum$_{GBi}$ are used to normalize the final predictor in GBi.

The supported weights of $w_1$ is {−¼, ⅜, ½, ⅝, 5⁄4}. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate.

3. Problems in Conventional Implementations

Alternative half-pel interpolation filters may be inherited in merge with motion vector difference (MMVD) mode even though the MV derived in MMVD mode are not of ½-pel precision, which is not reasonable.

When coding amvr_precision_idx and hpel_if_idx, all the bins are context coded.

4. Example Embodiments and Techniques

The embodiments detailed below should be considered as examples to explain general concepts. These embodiments should not be interpreted in a narrow way. Furthermore, these embodiments can be combined in any manner.

Decoder-side motion vector derivation (DMVD) is used to represent BDOF (bi-direction optical flow) or/and DMVR (decoder-side motion vector refinement) or/and other tools associated with refinement motion vector or prediction sample at decoder.

In the following text, the default interpolation filter may indicate the one defined in HEVC/VVC. Newly introduced interpolation filters (such as those proposed in JVET-N0309) may be also referred as alternative interpolation filters in the following description.

1. Alternative 1/N-pel interpolation filters may be used for different N with N unequal to 2.
   a. In one example, N may be equal to 4, 16 etc.
   b. In one example, the index of 1/N-pel interpolation filters may be signaled in AMVR mode.
      i. Alternatively, furthermore, the index of 1/N-pel interpolation filters may be signaled only when 1/N-pel MV/MVD precision is selected by the block.
   c. In one example, alternative 1/N-pel interpolation filters may be not inherited in merge mode or/and MMVD mode.
      i. Alternatively, furthermore, only default 1/N-pel interpolation filter may be used in merge mode or/and MMVD mode.
   d. In one example, alternative 1/N-pel interpolation filters may be inherited in merge mode.
   e. In one example, alternative 1/N-pel interpolation filters may be inherited in MMVD mode.
      i. In one example, alternative 1/N-pel interpolation filters may be inherited in MMVD mode when the final derived MVs are of 1/N-pel precision, i.e., no MV component is of finer MV precisions.
      ii. In one example, alternative 1/N-pel interpolation filters may be inherited in MMVD mode when K (K>=1) MV components of the final derived MVs are of 1/N-pel precision.
   f. In one example, alternative 1/N-pel interpolation filters may be inherited in MMVD mode or/and merge mode, however, alternative 1/N-pel interpolation filters are only used in motion compensation. The index of alternative 1/N-pel interpolation filters may not be stored for the block and may be not used by following coded blocks.

2. Indications of interpolation filters (such as default half-pel interpolation filter, alternative half-pel interpolation filters) may be stored together with other motion information, such as motion vectors, reference indices.
   a. In one example, for one block to be encoded/decoded, when it accesses a $2^{nd}$ block which is located in a different region (such as in different CTU rows, in different VPDU), the interpolation filters associated with the $2^{nd}$ block is disallowed to be utilized for encoding/decoding the current block.

3. Alternative half-pel interpolation filters may be not inherited in merge mode or/and MMVD mode.
   a. In one example, alternative half-pel interpolation filters may be not inherited in MMVD mode.
      i. Alternatively, furthermore, default half-pel interpolation filter in VVC may be always used for MMVD mode.

ii. Alternatively, the alternative half-pel interpolation filters may be inherited in MMVD mode. That is, for MMVD mode, the alternative half-pel interpolation filter associated with the base merge candidate may be inherited.
b. In one example, alternative half-pel interpolation filters may be inherited in MMVD mode under certain conditions.
   i. In one example, alternative half-pel interpolation filters may be inherited when the final derived MVs are of ½-pel precision, i.e., no MV component is of finer MV precision like ¼-pel precision, 1/16-pel precision.
   ii. In one example, alternative half-pel interpolation filters may be inherited in MMVD mode when K (K>=1) MV components of the final derived MVs are of ½-pel precision.
c. In one example, alternative half-pel interpolation filters may be inherited in MMVD mode or/and merge mode, however, alternative half-pel interpolation filters are only used in motion compensation. The index of default half-pel interpolation filters, instead of alternative half-pel interpolation filters, may be stored for the block and may be used by following coded blocks.
d. The above methods may be applicable to the other cases wherein multiple interpolation filters for the 1/N-pel precision may be applied.
4. Interpolation filter information may be stored in history-based motion vector prediction (HMVP) table and may be inherited by HMVP merge candidate. In some implementations, a HMVP table is updated, selectively after the conversion between a video block of a video region and a coded representation. Whether to update the table, i.e., selectivity in updating the table, is based on determining, after the conversion of the video block, whether there is a motion candidate used in the conversion that is suitable for updating the HMVP table (e.g., by applying pruning, etc.).
   a. In one example, when inserting a new candidate into the HMVP lookup table, the interpolation filter information may be considered. For example, two candidates with same motion information but different interpolation filter information may be considered as two different candidates.
   b. In one example, when inserting a new candidate into the HMVP lookup table, two candidates with same motion information but different interpolation filter information may be considered as same candidates.
5. When inserting merge candidates into the merge candidate list, interpolation filter information may be considered in the pruning process.
   a. In one example, two merge candidates with different interpolation filters may be considered as two different merge candidates.
   b. In one example, when inserting the HMVP merge candidates into the merge list, interpolation filter information may be considered in the pruning process.
   c. In one example, when inserting the HMVP merge candidates into the merge list, interpolation filter information may be not considered in the pruning process.
6. When generating pair-wise merge candidates or/and combined merge candidates or/and zero motion vector candidates or/and other default candidates, interpolation filter information may be taken into consideration instead of always using the default interpolation filter.
   a. In one example, if both candidates (involved in generating pair-wise merge candidates or/and combined merge candidates) employ same alternative interpolation filter, such interpolation filter may be inherited in the pair-wise merge candidates or/and combined merge candidates.
   b. In one example, if one of two candidates (involved in generating pair-wise merge candidates or/and combined merge candidates) does not employ default interpolation filter, its interpolation filter may be inherited in the pair-wise merge candidates or/and combined merge candidates.
   c. In one example, if one of the two candidates (involved in generating combined merge candidates) does not employ default interpolation filter, its interpolation filter may be inherited in the combined merge candidates. However, such interpolation filter may be only used for the corresponding prediction direction.
   d. In one example, if the two candidates (involved in generating combined merge candidates) employ different interpolation filters, their interpolation filters may be both inherited in the combined merge candidates. In this case, different interpolation filter may be used for different prediction directions.
   e. In one example, no more than K (K>=0) pair-wise merge candidates or/and combined merge candidates may use alternative interpolation filters.
   f. In one example, default interpolation filters are always used for pair-wise merge candidates or/and combined merge candidates.
7. It is proposed to disable the usage of half-pel motion vector/motion vector difference precision when the current block is coded with IBC mode.
   a. Alternatively, furthermore, there is no need to signal the indication of usage of half-pel MV/MVD precision.
   b. In one example, alternative half-pel interpolation filter is always disabled if the current block is coded with IBC mode.
   c. Alternatively, furthermore, there is no need to signal the indication of half-pel interpolation filter.
   d. In one example, the condition of 'the current block is coded with IBC mode' may be replaced by 'the current block is coded with a mode'. Such a mode may be defined as triangular mode, merge mode, etc.
   a1. One example mode corresponds to a coding mode in which a block is divided into two parts, each part is associated with one motion candidate and two motion candidates are derived from a same motion candidate list.
8. When encoding amvr_precision_idx and/or hpel_if_idx, only the first bin may be context-coded.
   a. Alternatively, furthermore, other bins may be bypass-coded.
   b. In one example, the first bin of amvr_precision_idx may be bypass-coded.
   c. In one example, the first bin of hpel_if_idx may be bypass-coded.
   d. In one example, only 1 context may be used to code the first bin of amvr_precision_idx.
   e. In one example, only 1 context may be used to code the first bin of hpel_if_idx.
   f. In one example, all bins of amvr_precision_idx may share one same context.

g. In one example, all bins of hpel_if_idx may share one same context.
9. Some coding tools may be disallowed when alternative interpolation filters are employed.
   a. In one example, bi-directional optical flow (BDOF) may be disallowed when alternative interpolation filters are employed.
   b. In one example, DMVR or/and DMVD may be disallowed when alternative interpolation filters are employed.
   c. In one example, CIIP (combined inter-intra prediction) may be disallowed when alternative interpolation filters are employed.
      i. In one example, CIIP flag may be skipped and inferred to be false when a merge candidate inherits alternative interpolation filters.
      ii. Alternatively, when CIIP flag is true, default interpolation filter may be always employed.
   d. In one example, SMVD (symmetric motion vector difference) may be disallowed when alternative interpolation filters are employed.
      i. In one example, when SMVD is employed, default interpolation filters are always used, and syntax elements related to alternatively interpolation filters are not signaled.
      ii. Alternatively, when syntax elements related to alternatively interpolation filters indicate that alternative interpolation filters are employed, SMVD related syntax elements may be not signaled and SMVD mode is not used.
   e. In one example, SBT (subblock transform) may be disallowed when alternative interpolation filters are employed.
      i. In one example, when SBT is employed, default interpolation filters are always used, and syntax elements related to alternatively interpolation filters are not signaled.
      ii. Alternatively, when syntax elements related to alternatively interpolation filters indicate that alternative interpolation filters are employed, SBT related syntax elements may be not signaled and SBT is not used.
   f. In one example, triangle prediction and other coding modes, in which a block is divided into two parts, may be disallowed when alternative interpolation filters are employed. In some implementations, when the block is divided into two parts, each part is associated with one motion candidate and two motion candidates are derived from a same motion candidate list.
      i. In one example, interpolation filter information may be not inherited in triangle prediction and only default interpolation filters may be used.
   g. Alternatively, triangle prediction and other coding modes, in which a block is divided into two parts, may be allowed when alternative interpolation filters are employed. In some implementations, when the block is divided into two parts, each part is associated with one motion candidate and two motion candidates are derived from a same motion candidate list.
      i. In one example, interpolation filter information may be inherited in triangle prediction.
   h. Alternatively, for a coding tool which is mentioned above, if it is enabled, then the alternative half-pel interpolation filter may be disabled.
10. A filter may be applied to N-pel precision MVs.
    a. In one example, N may be equal to 1, 2 or 4 etc.
    b. In one example, the filter may be a low-pass filter.
    c. In one example, the filter may be a 1-d filter.
       i. For example, the filter may be a 1-d horizontal filter.
       ii. For example, the filter may be a 1-d vertical filter.
    d. In one example, a flag may be signaled to indicate whether such filter is employed or not.
       i. Alternatively, furthermore, such flag may be signaled only when the N-pel MVD precision (signaled in AMVR mode) is used for the block.
11. Different weighing factor sets may be used for regular inter mode and affine mode in GBI mode.
    a. In one example, weighting factor sets used for regular inter mode and affine mode may be signaled in SPS/tile group header/slice header/VPS/PPS etc.
    b. In one example, weighting factor sets used for regular inter mode and affine mode may be pre-defined at encoder and decoder.
12. How to define/select alternative interpolation filters may depend on the coded mode information.
    a. In one example, for the affine mode, and non-affine mode, the allowed sets of alternative interpolation filters may be different.
    b. In one example, for the IBC mode, and non-IBC mode, the allowed sets of alternative interpolation filters may be different.

5. Example Implementations of the Disclosed Technology

Figure 11A:
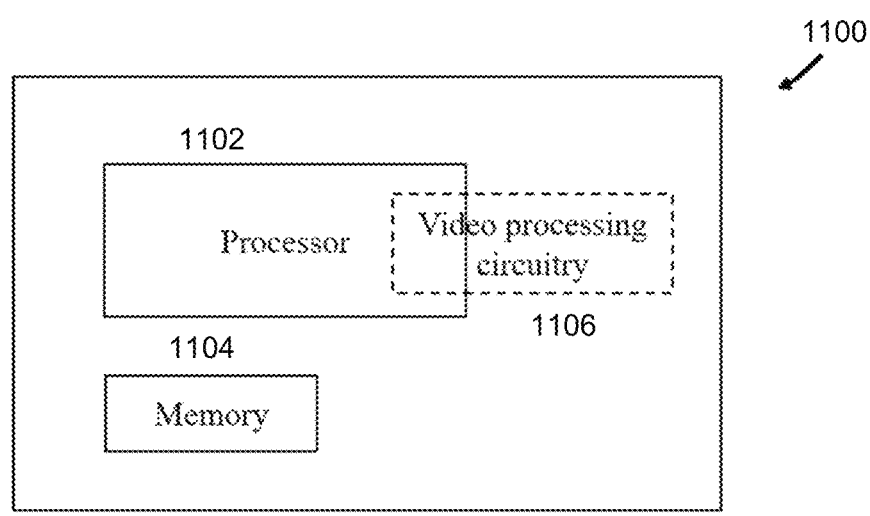
FIGS. 11A and 11B are block diagrams of examples of a hardware platform for implementing a visual media decoding or a visual media encoding technique described in the present document.

FIG. 11A is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document, and may be partly or completely be a part of the processors 1102 (e.g., graphics processor core GPU or other signal processing circuitry).

Figure 11B:
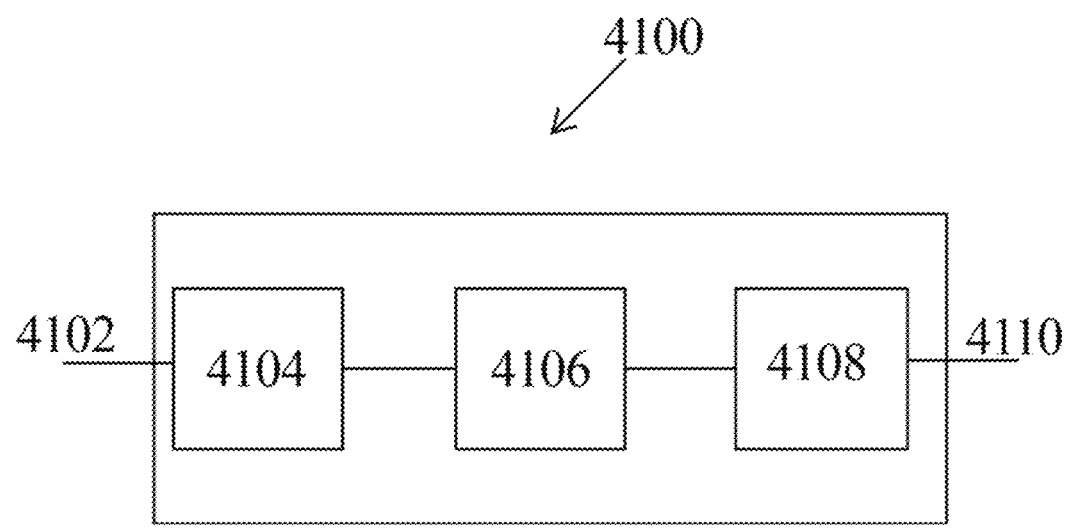

FIG. 11B is another example of a block diagram of a video processing system in which disclosed techniques may be implemented. FIG. 11B is a block diagram showing an example video processing system 4100 in which various techniques disclosed herein may be implemented. Various implementations may include some or all of the components of the system 4100. The system 4100 may include input 4102 for receiving video content. The video content may be received in a raw or uncompressed format, e.g., 8 or 10 bit multi-component pixel values, or may be in a compressed or encoded format. The input 4102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4100 may include a coding component 4104 that may implement the various coding or encoding methods described in the present document. The coding component 4104 may reduce the average bitrate of video from the input 4102 to the output of the coding component 4104 to produce a coded representation of the video. The coding techniques are therefore sometimes called video compression or video transcoding techniques. The output of the coding component 4104 may be either stored, or transmitted via a communication connected, as represented by the component 4106. The stored or communicated bitstream (or coded) representation of the video received at the input 4102 may be used by the component 4108 for generating pixel values or displayable video that is sent to a display interface 4110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 12A:
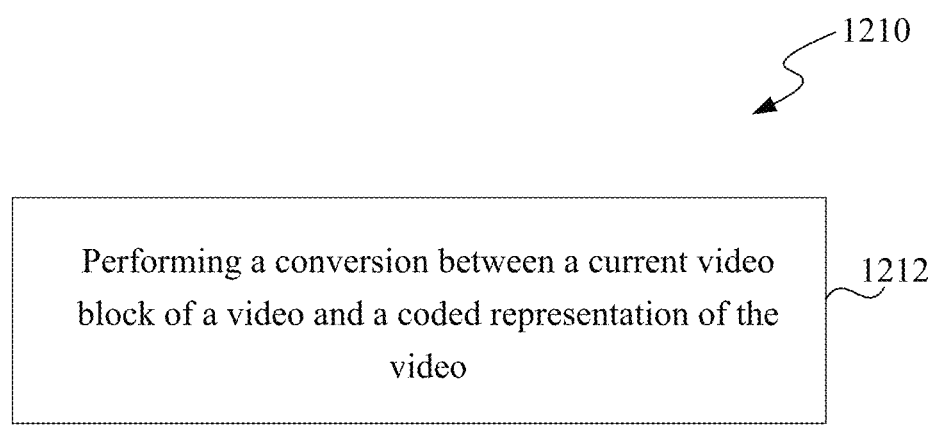
FIGS. 12A and 12B show flowcharts of example methods for video processing based on some implementations of the disclosed technology.

FIG. 12A is a flowchart for an example method 1210 of video processing. The method 1210 includes, at 1212, performing a conversion between a current video block of a video and a coded representation of the video. In some implementations, the coded representation includes a first parameter that indicates a motion information precision from a multiple precision set for the current video block that does not use a default motion information precision and/or a second parameter which identifies whether an alternative half-pel interpolation filter is used for the conversion. In some implementations, each of the first parameter and/or the second parameter is associated with one or more bins and a context-model based coding is only used for a first bin of the one or more bins in the coded representation. In some implementations, the current video block is represented in the coded representation using a merge mode or a merge with motion vector different (MMVD) mode, wherein an interpolation filter having a 1/N precision is used for interpolating a prediction block associated with the current video block according to a rule, wherein N is a positive integer; wherein the rule defines a condition for inheriting interpolation information in case that the interpolation filter is an alternative interpolation filter that is different from a default interpolation filter.

Figure 12B:
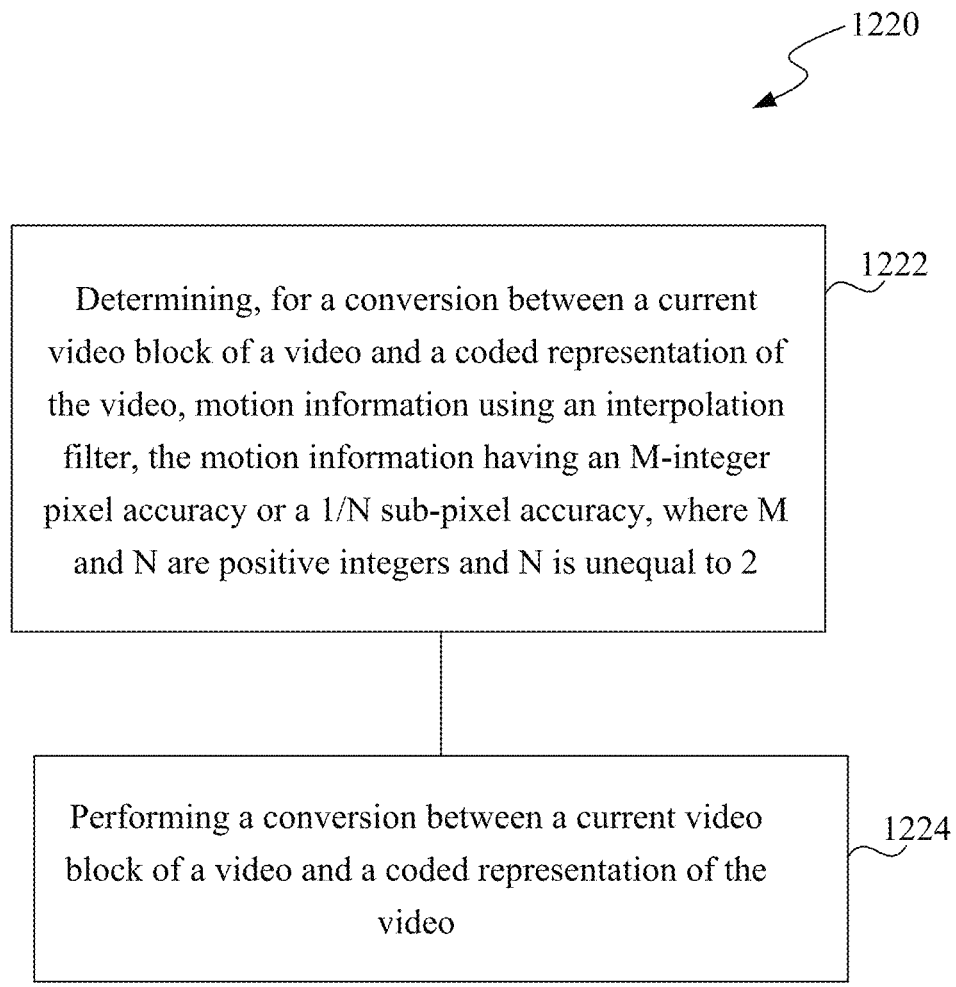

FIG. 12B is a flowchart for an example method 1220 of video processing. The method 1220 includes, at 1222, determining, for a conversion between a current video block of a video and a coded representation of the video, motion information using an interpolation filter, the motion information having an M-integer pixel accuracy or a 1/N sub-pixel accuracy, where M and N are positive integers and N is unequal to 2. The method 1220 further includes, at 1224, performing the conversion based on the motion information.

Figure 13A:
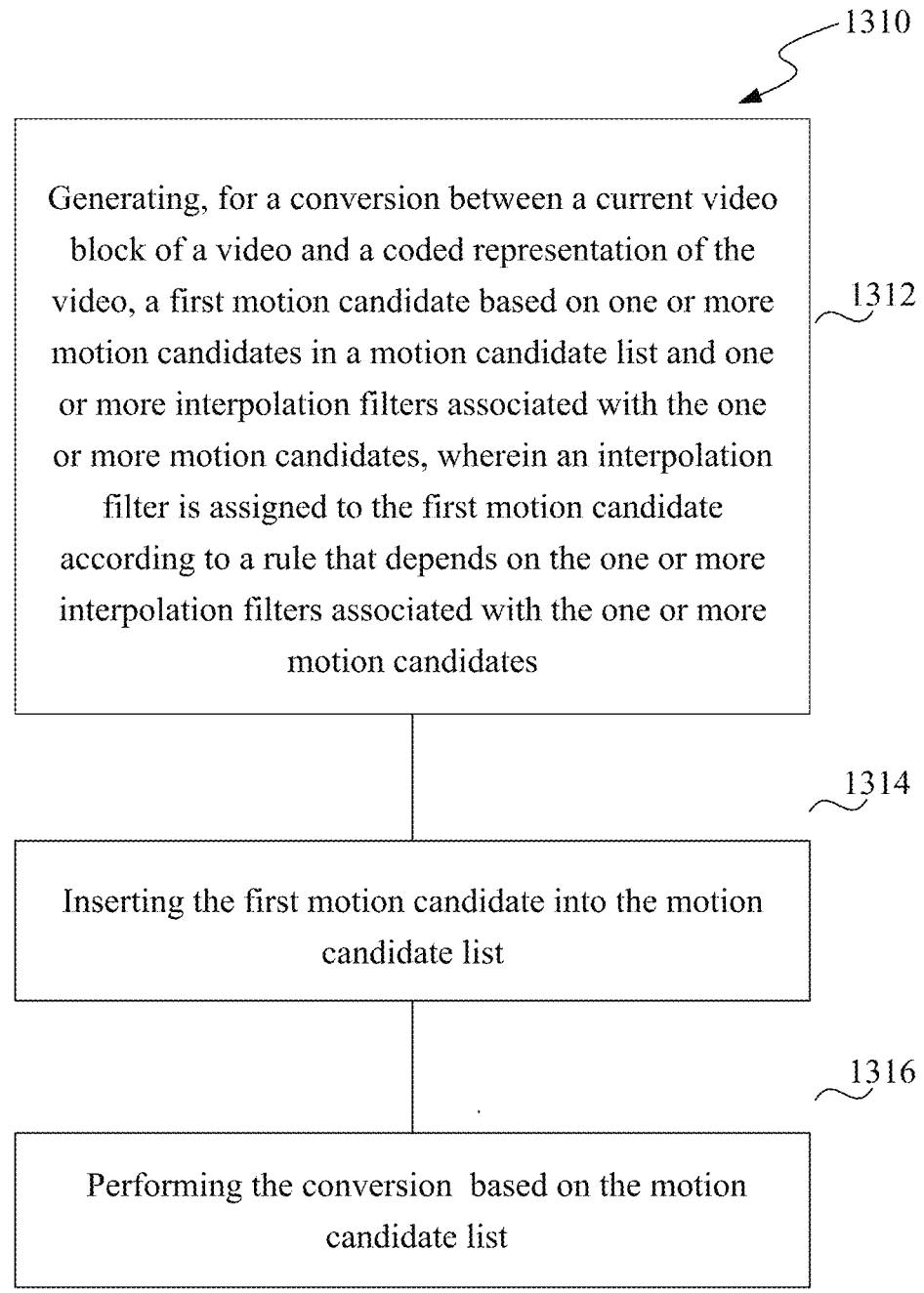
FIGS. 13A to 13C show flowcharts of example methods for video processing based on some implementations of the disclosed technology.
Figure 13B:
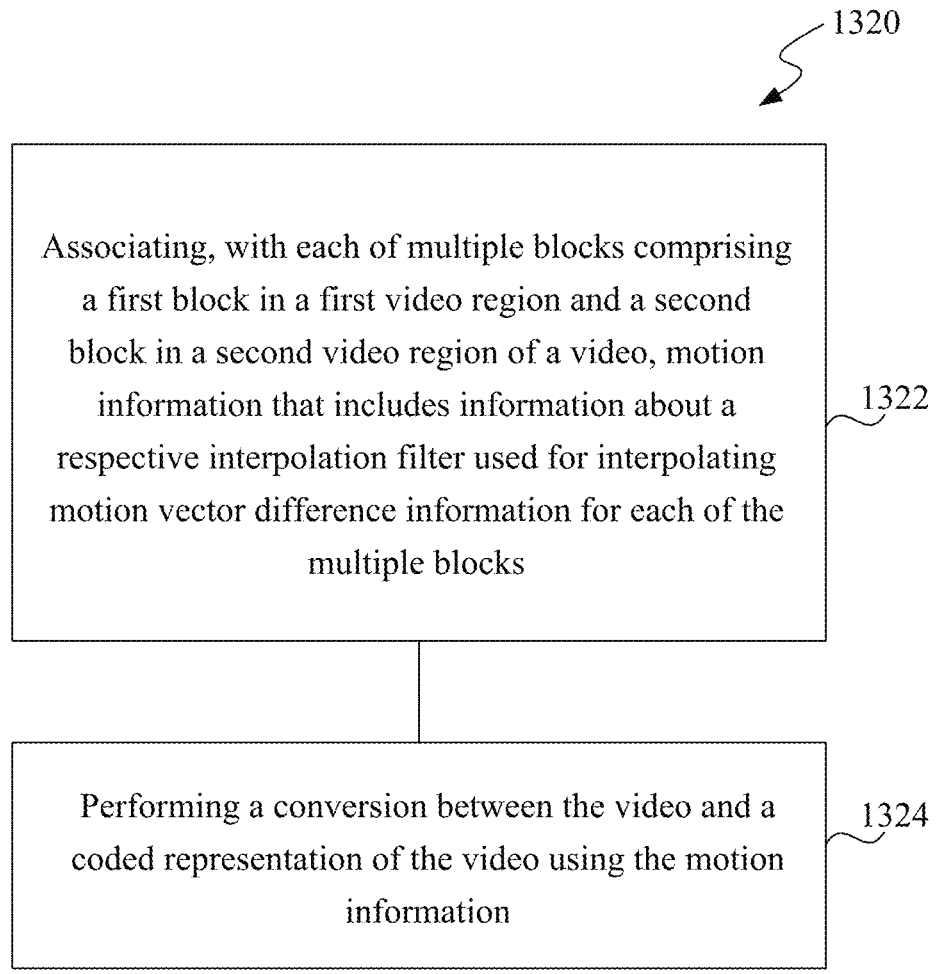

FIG. 13A is a flowchart for an example method 1310 of video processing. The method 1310 includes, at 1312, generating, for a conversion between a current video block of a video and a coded representation of the video, a first motion candidate based on one or more motion candidates in a motion candidate list and one or more interpolation filters associated with the one or more motion candidates, wherein an interpolation filter is assigned to the first motion candidate according to a rule that depends on the one or more interpolation filters associated with the one or more motion candidates. The method 1310 further includes, at 1314, inserting the first motion candidate into the motion candidate list. The method 1310 further includes, at 1316, performing the conversion based on the motion candidate list FIG. 13B is a flowchart for an example method 1320 of video processing. The method 1320 includes, at 1322, associating, with each of multiple blocks comprising a first block in a first video region and a second block in a second video region of a video, motion information that includes information about a respective interpolation filter used for interpolating motion vector difference information for each of the multiple blocks. The method 1320 further includes, at 1324, performing a conversion between the video and a coded representation of the video using the motion information.

Figure 13C:
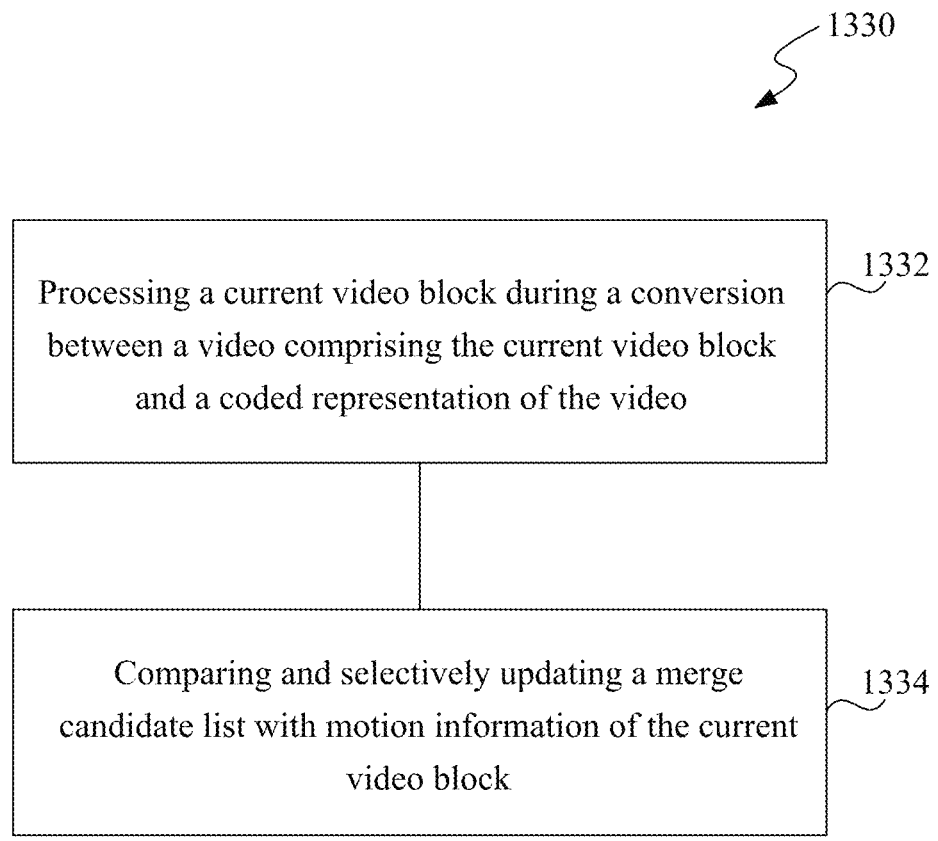

FIG. 13C is a flowchart for an example method 1330 of video processing. The method 1330 includes, at 1332, processing a current video block during a conversion between a video comprising the current video block and a coded representation of the video. The method 1330 further includes, at 1334, comparing and selectively updating a merge candidate list with motion information of the current video block. In some implementations, the motion information includes interpolation filter information and the interpolation filter information includes parameters of an interpolation filter used for interpolating motion vector difference values used for representing the current video block in the coded representation.

Figure 14A:
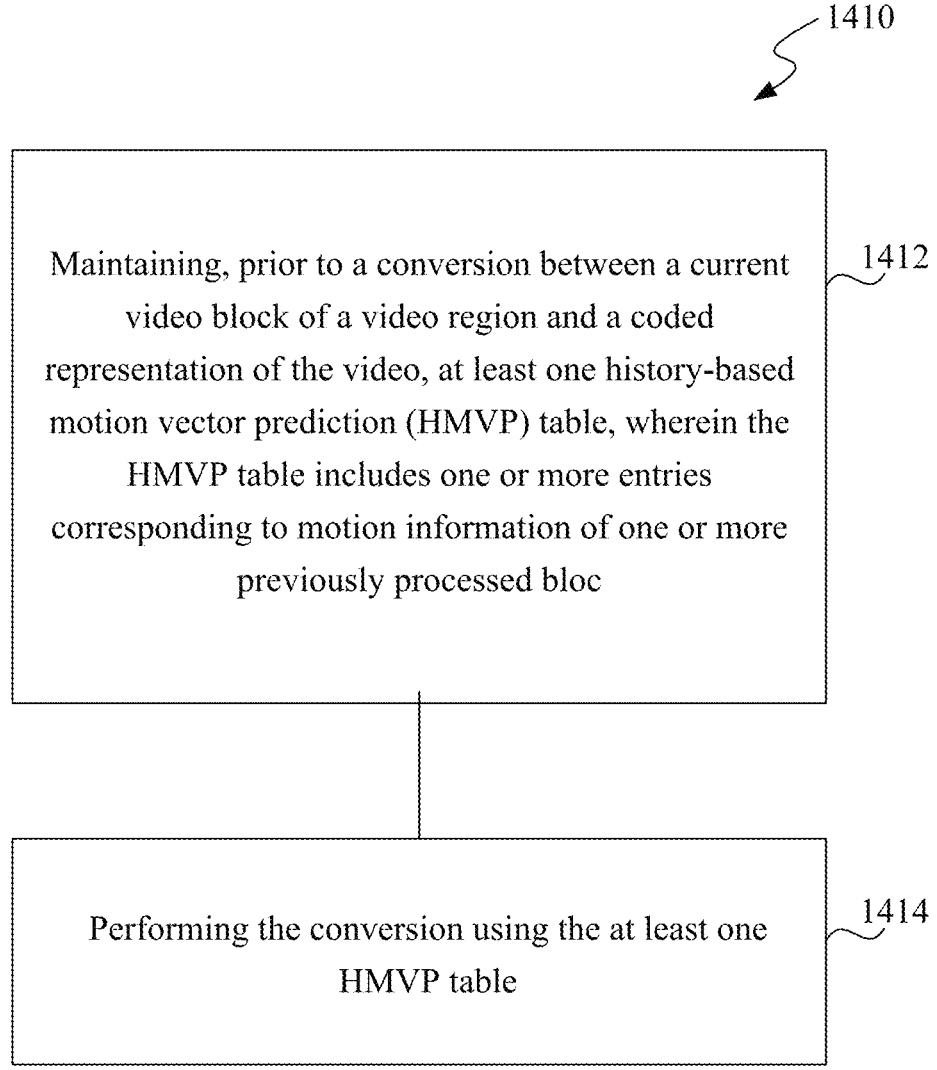
FIGS. 14A and 14B show flowcharts of example methods for video processing based on some implementations of the disclosed technology.

FIG. 14A is a flowchart for an example method 1410 of video processing. The method 1410 includes, at 1412, maintaining, prior to a conversion between a current video block of a video region and a coded representation of the video, at least one history-based motion vector prediction (HMVP) table, wherein the HMVP table includes one or more entries corresponding to motion information of one or more previously processed blocks. The method 1410 further includes, at 1414, performing the conversion using the at least one HMVP table. In some implementations, the motion information of each entry is configured to include interpolation filter information for the one or more previously processed blocks. In some implementations, the interpolation filter information indicates interpolation filters used for interpolating prediction blocks of the one or more previously processed blocks.

Figure 14B:
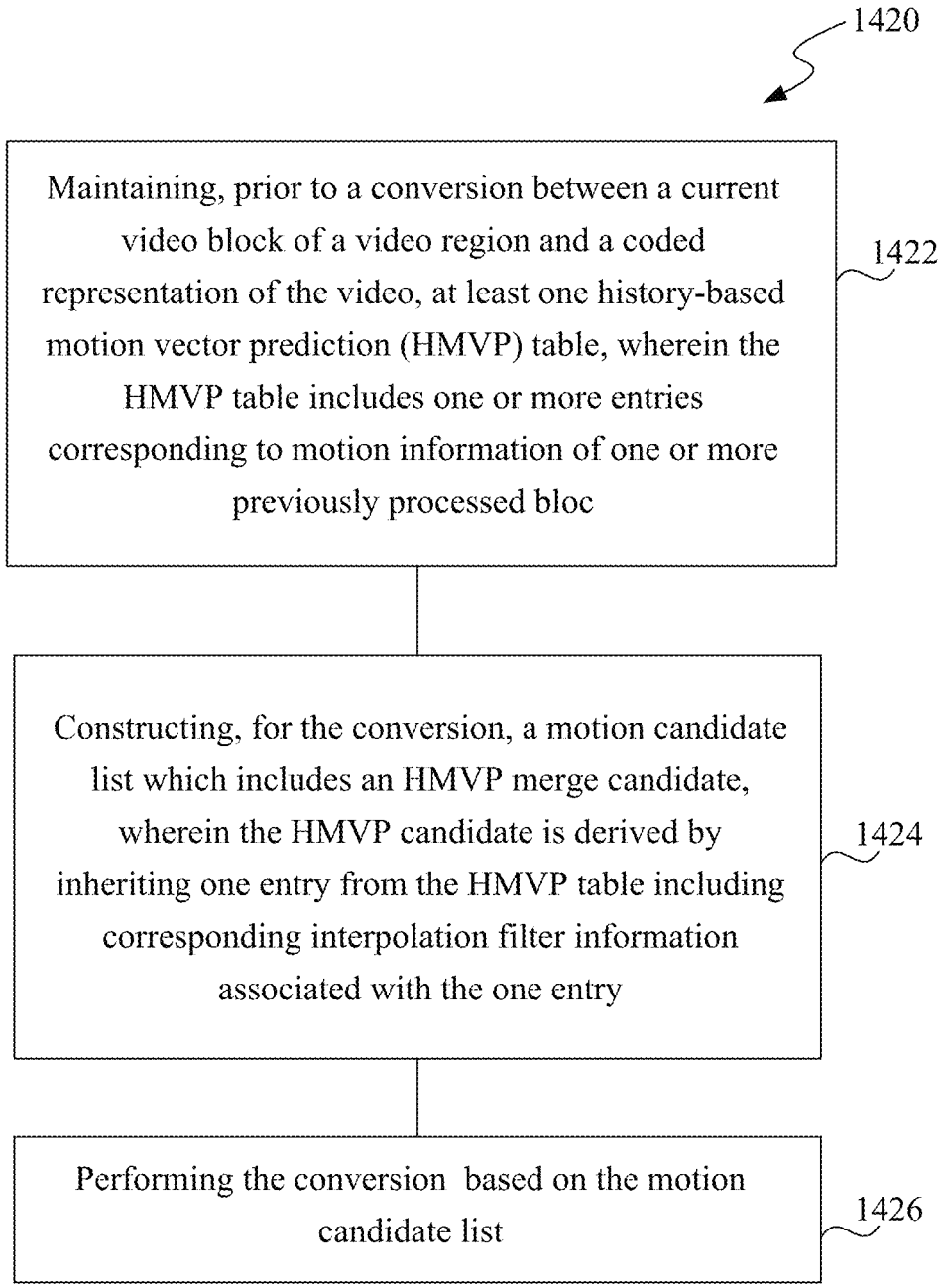

FIG. 14B is a flowchart for an example method 1420 of video processing. The method 1420 includes, at 1422, maintaining, prior to a conversion between a current video block of a video region and a coded representation of the video, at least one history-based motion vector prediction (HMVP) table that includes one or more entries corresponding to motion information of one or more previously processed blocks, and wherein the motion information of each entry is configured to include interpolation filter information for the one or more previously processed blocks. The method 1420 further includes, at 1424, constructing, for the conversion, a motion candidate list which includes an HMVP merge candidate, wherein the HMVP candidate is derived by inheriting one entry from the HMVP table including corresponding interpolation filter information associated with the one entry. The method 1420 further includes, at 1426, performing the conversion based on the motion candidate list.

Figure 15A:
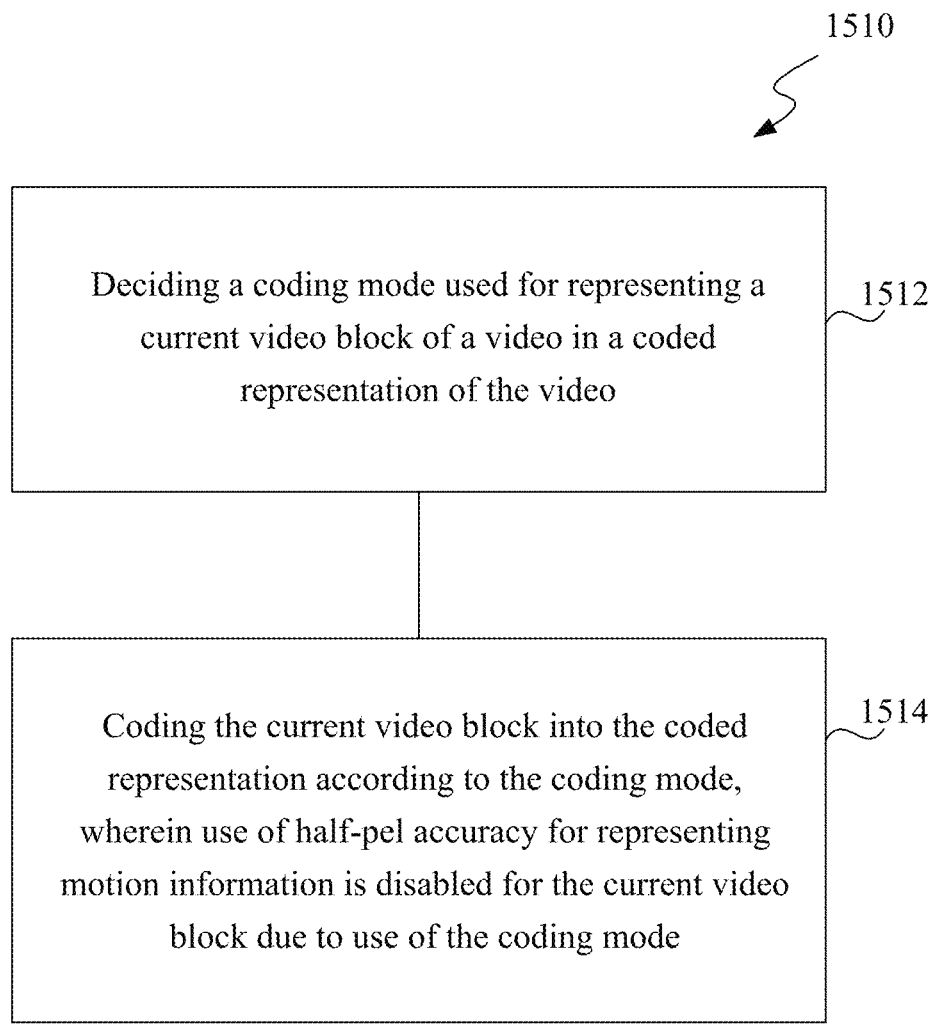
FIGS. 15A to 15D show flowcharts of example methods for video processing based on some implementations of the disclosed technology.

FIG. 15A is a flowchart for an example method 1510 of video processing. The method 1510 includes, at 1512, deciding a coding mode used for representing a current video block of a video in a coded representation of the video. The method 1510 further includes, at 1514, coding the current video block into the coded representation according to the coding mode, wherein use of half-pel accuracy for representing motion information is disabled for the current video block due to use of the coding mode.

Figure 15B:
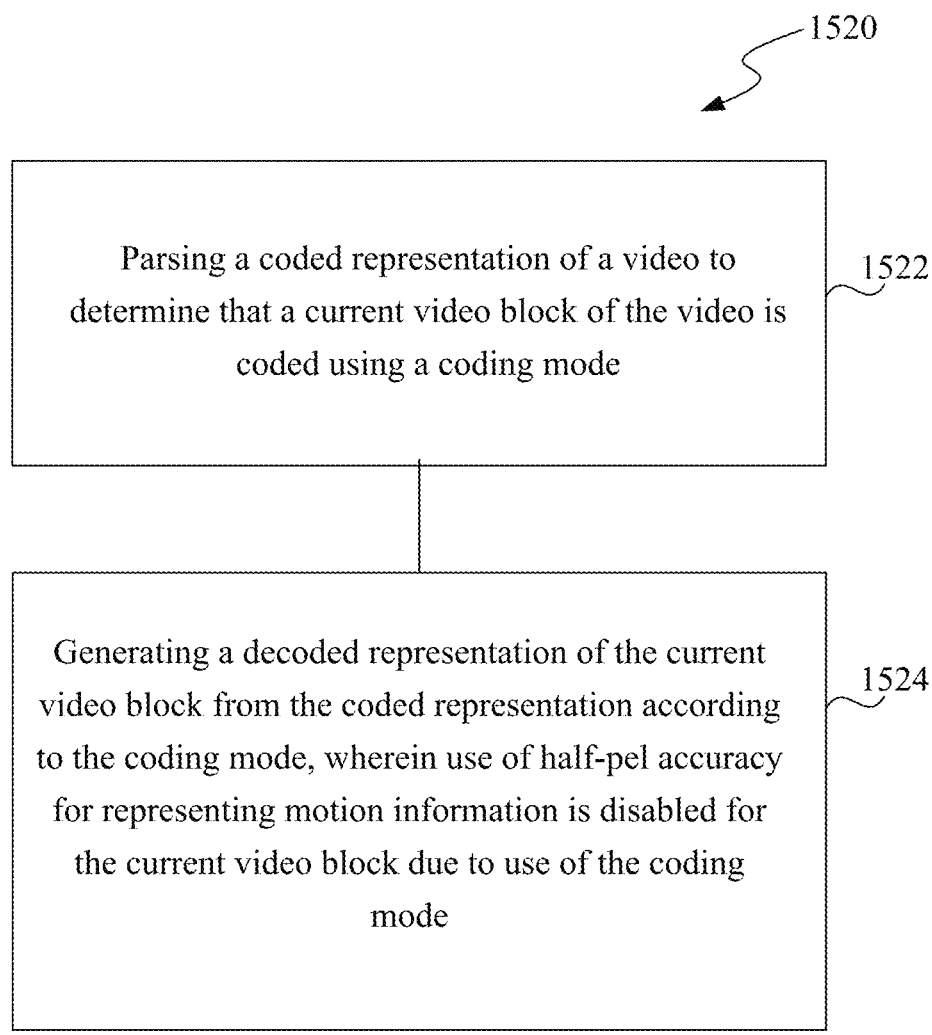

FIG. 15B is a flowchart for an example method 1520 of video processing. The method 1520 includes, at 1522, parsing a coded representation of a video to determine that a current video block of the video is coded using a coding mode. The method 1520 further includes, at 1524, generating a decoded representation of the current video block from the coded representation according to the coding mode, wherein use of half-pel accuracy for representing motion information is disabled for the current video block due to use of the coding mode.

Figure 15C:
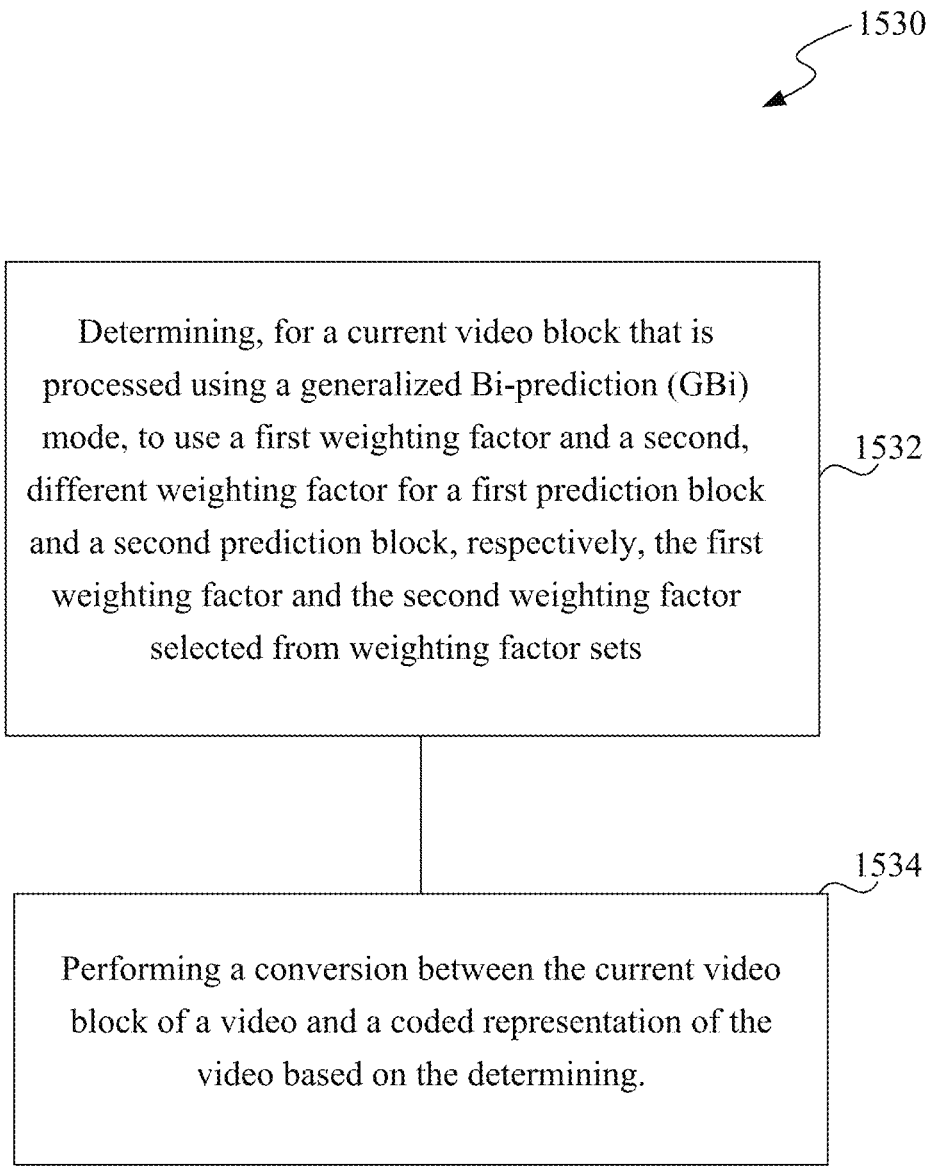

FIG. 15C is a flowchart for an example method 1530 of video processing. The method 1530 includes, at 1532, determining, for a current video block that is processed using a generalized Bi-prediction (GBi) mode, to use a first weighting factor and a second, different weighting factor for a first prediction block and a second prediction block, respectively, the first weighting factor and the second weighting factor selected from weighting factor sets. The method 1530 further includes, at 1534, performing a conversion between the current video block of a video and a coded representation of the video based on the determining. In some implementations, a first weighting factor set used for an inter mode is different from a second weighting factor set used for an affine inter mode.

Figure 15D:
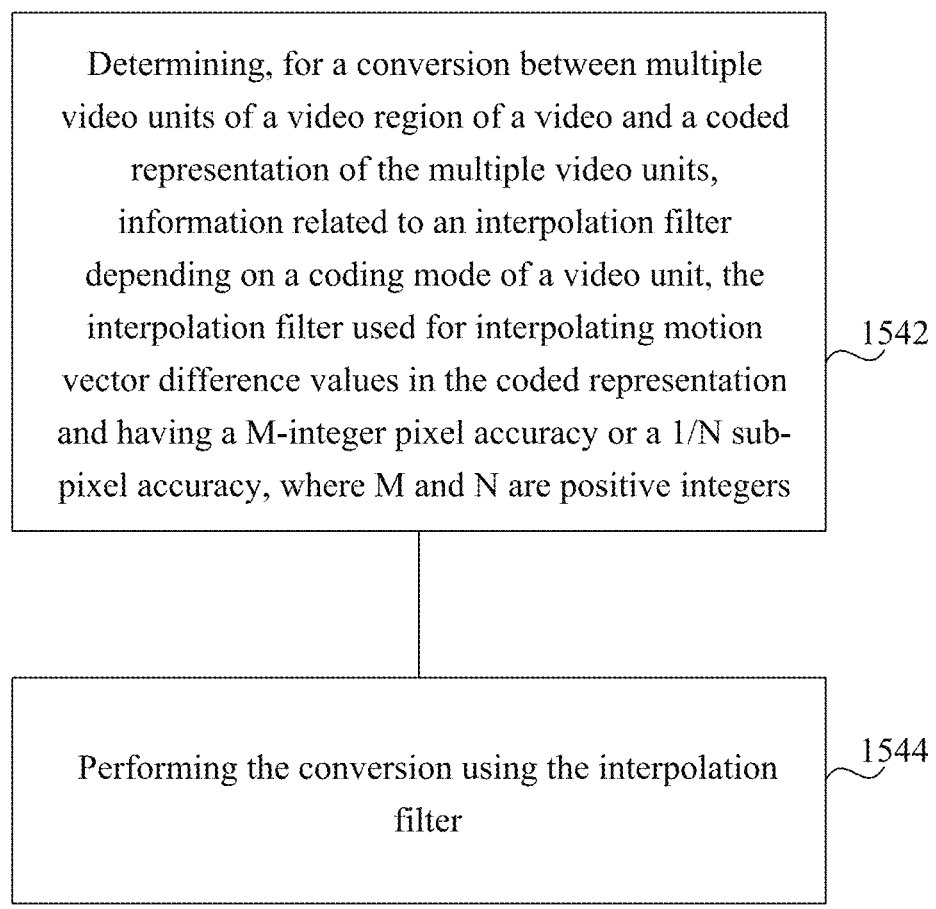

FIG. 15D is a flowchart for an example method 1540 of video processing. The method 1540 includes, at 1542, determining, for a conversion between multiple video units of a video region of a video and a coded representation of the multiple video units, information related to an interpolation filter depending on a coding mode of a video unit, the interpolation filter used for interpolating motion vector difference values in the coded representation and having a M-integer pixel accuracy or a 1/N sub-pixel accuracy, where M and N are positive integers. The method 1540 further includes, at 1544, performing the conversion using the interpolation filter.

Figure 16A:
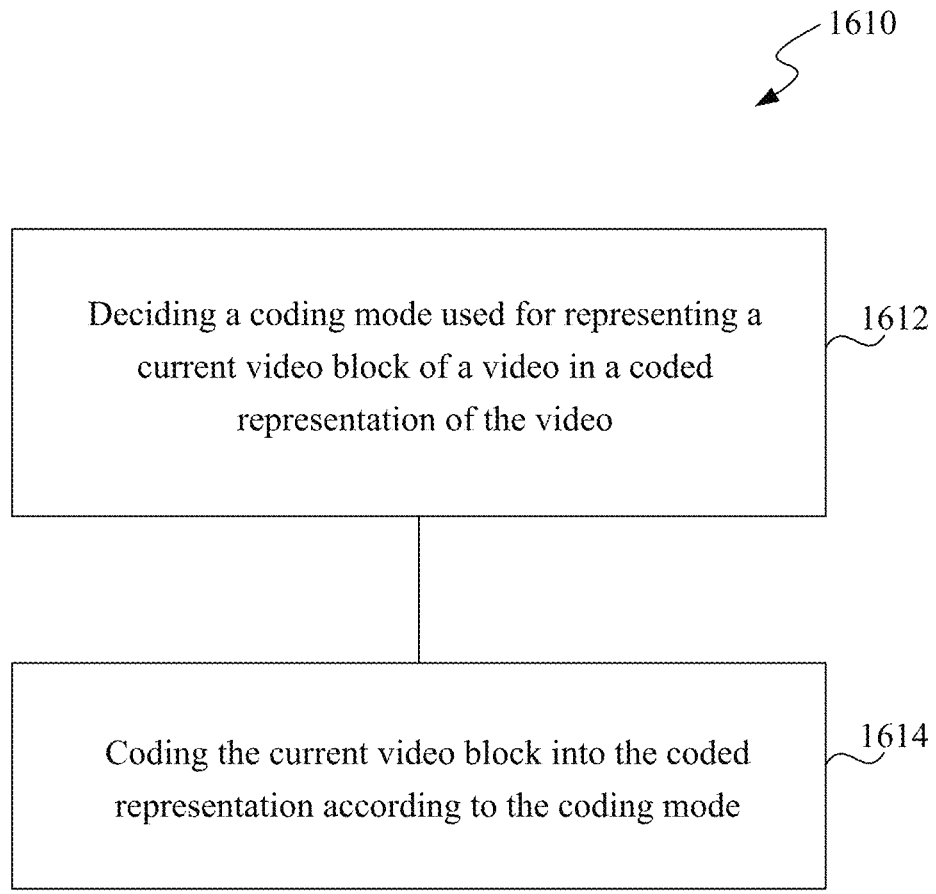
FIGS. 16A to 16D show flowcharts of example methods for video processing based on some implementations of the disclosed technology.

FIG. 16A is a flowchart for an example method 1610 of video processing. The method 1610 includes, at 1612, deciding a coding mode used for representing a current video block of a video in a coded representation of the video. The method 1610 further includes, at 1614, coding the current video block into the coded representation according to the coding mode. In some implementations, use of alternative half-pel accuracy filters in addition to a default half-pel accuracy filter for representing motion information is disabled for the current video block due to use of the coding mode.

Figure 16B:
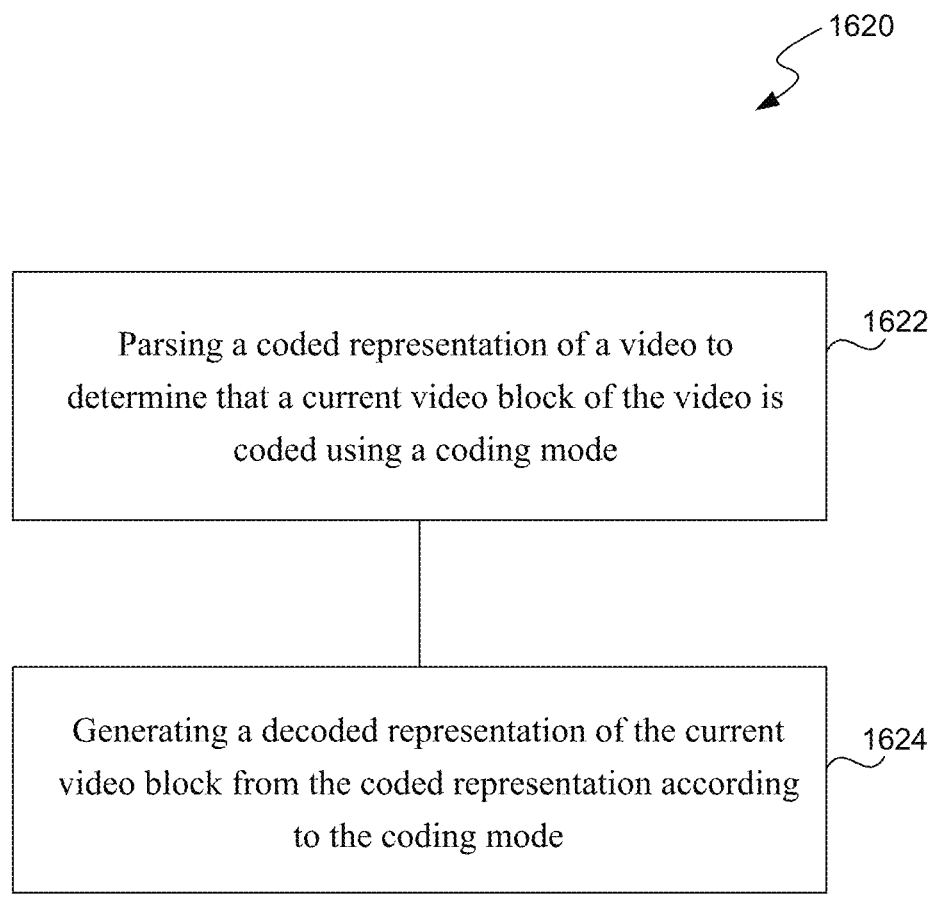

FIG. 16B is a flowchart for an example method 1620 of video processing. The method 1620 includes, at 1622, parsing a coded representation of a video to determine that a current video block of the video is coded using a coding mode. The method 1620 further includes, at 1624, generating a decoded representation of the current video block from the coded representation according to the coding mode, In some implementations, use of alternative half-pel accuracy filters in addition to a default half-pel accuracy filter for representing motion information is disabled for the current video block due to use of the coding mode.

Figure 16C:
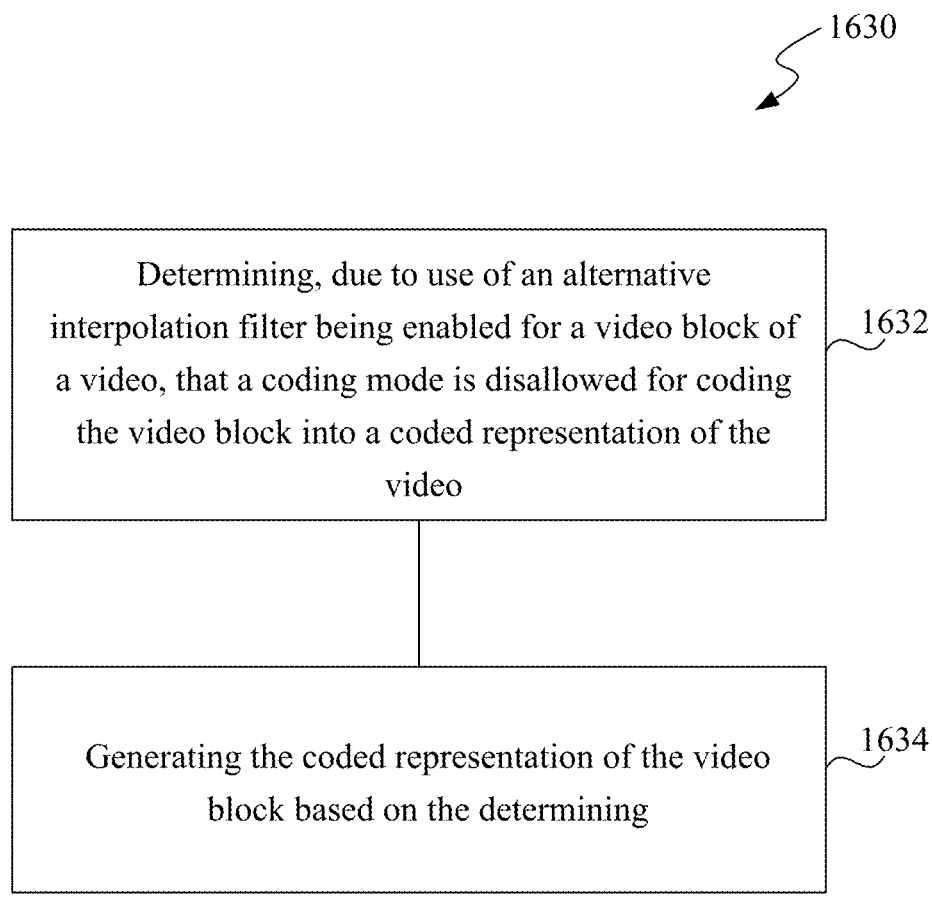

FIG. 16C is a flowchart for an example method 1630 of video processing. The method 1630 includes, at 1632, determining, due to use of an alternative interpolation filter being enabled for a video block of a video, that a coding mode is disallowed for coding the video block into a coded representation of the video. The method 1630 further includes, at 1634, generating the coded representation of the video block based on the determining, wherein the alternative interpolation filter is used for interpolating inter prediction blocks of the current video block.

Figure 16D:
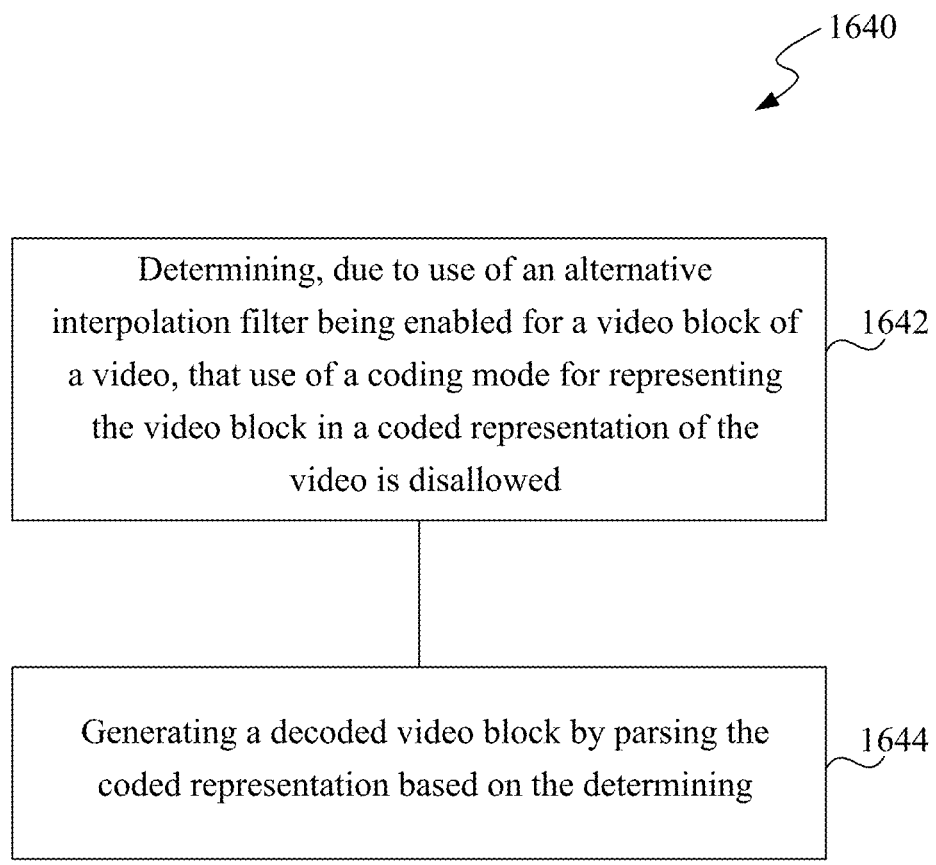

FIG. 16D is a flowchart for an example method 1640 of video processing. The method 1640 includes, at 1642, determining, due to use of an alternative interpolation filter being enabled for a video block of a video, that use of a coding mode for representing the video block in a coded representation of the video is disallowed. The method 1640 further includes, at 1644, generating a decoded video block by parsing the coded representation based on the determining.

Various techniques and embodiments may be described using the following clause-based format.

The first set of clauses describe certain features and aspects of the disclosed techniques in the previous section.

1. A method of video processing, comprising: determining, for a current video block, a single set of motion information based on applying at least one interpolation filter to a set of neighboring blocks, wherein the at least one interpolation filter is configurable to an integer pixel accuracy or a sub-pixel accuracy of the single set of motion information; and performing a conversion between the current video block and a bitstream representation of the current video block, wherein the conversion includes a decoder motion vector refinement (DMVR) step for refining the single set of motion information signaled in the bitstream representation.

2. The method of clause 1, wherein when the single set of motion information is associated with an adaptive motion vector resolution (AMVR) mode, an index of the at least one interpolation filter is signaled in the bitstream representation.

3. The method of clause 1, wherein when the single set of motion information is associated with a merge mode, an index of the at least one interpolation filter is inherited from a previous video block.

4. The method of clause 1, wherein when the single set of motion information is associated with a merge with motion vector difference (MMVD) mode, an index of the at least one interpolation filter is inherited from a previous video block.

5. The method of clause 1, wherein the at least one interpolation filter corresponds to a default filter with the sub-pixel accuracy, and wherein the single set of motion information is associated with a merge with motion vector difference (MMVD) mode.

6. The method of any of clauses 2-4, wherein coefficients of the at least one interpolation filter for the current video block are inherited from the previous video block.

7. The method of any of clauses 1-6, wherein the sub-pixel accuracy of the single set of motion information equals ¼ pixel or 1/16 pixel.

8. The method of any of clauses 1-7, wherein one or more components of the single set of motion information have the sub-pixel accuracy.

9. The method of clause 1, wherein the at least one interpolation filter is expressed using 6 coefficients or 8 coefficients.

10. The method of clause 5, wherein an index of the at least one interpolation filter is associated exclusively for the current video block and not associated for subsequent video blocks.

11. The method of clause 1, wherein information related to the at least one interpolation filter is stored along with the single set of motion information.

12. The method of clause 11, wherein the information related to the at least one interpolation filter identifies the at least one interpolation filter as a default filter.

13. The method of clause 1, wherein coefficients of the at least one interpolation filter for the current video block are prevented from utilization by an interpolation filter of another video block.

14. The method of any of clause 1-13, wherein the at least one interpolation filter corresponds to a plurality of filters, each filter in the plurality of filters associated with the sub-pixel accuracy of the single set of motion information.

15. The method of any of clauses 1-14, wherein a precision of each component of the single set of motion information is equal to or lower than the sub-pixel accuracy the of the single set of motion information.

16. The method of any of clauses 1-15, wherein the at least one interpolation filter is stored in a history-based motion vector prediction (HMVP) lookup table.

17. The method of clause 16, further comprising:
upon detecting that motion information of another video block is same as the single set of motion of the current video block, inserting the single set of motion information into the HMVP table without inserting the motion information of the another video block.

18. The method of clause 16, further comprising: upon detecting that motion information of another video block is same as the single set of motion of the current video block, inserting, into the HMVP table, the single set of motion information of the current video block and the motion information of the another video block.

19. The method of any of clauses 17-18, wherein the another video block is associated with an interpolation filter, and wherein the inserting is based, at least in part on the at least one interpolation filter of the current video block and/or the interpolation filter of the another video block.

20. The method of any of clauses 17-19, wherein the current video block and the another video block correspond to pair-wise candidates or combined merge candidates.

21. The method of any of clauses 17-20, wherein the at least one interpolation filter of the current video block and the interpolation filter of the another video block are same.

22. The method of any of clauses 17-20, wherein the at least one interpolation filter of the current video block and the interpolation filter of the another video block are different.

23. The method of clause 1, wherein the current video block is coded in an Intra Block Copy (IBC) mode, and wherein a usage of the sub-pixel accuracy in representation of the single set of motion information is disabled.

24. The method of any of clauses 1-23, wherein a usage of the at least one interpolation filter is disabled.

25. The method of clause 1, wherein the at least one interpolation filter is associated with a amvr_precision_idx flag and/or a hpel_if_idx flag.

26. The method of clause 25, wherein the amvr_precision_idx flag and/or the hpel_if_idx flag are/is associated with bypass-coded bins or context-coded bins.

27. The method of clause 26, wherein a first bin is a bypass-coded bin or a context-coded bin.

28. The method of any of clauses 25-27, wherein all bins share a same context.

29. The method of clause 1, wherein one or more video processing steps are disabled based on employing the at least one interpolation filter.

30. The method of clause 29, wherein the one or more video processing steps include the decoder motion vector refinement (DMVR) step, a bi-directional optical flow (BDOF) step, a combined inter-intra prediction (CIIP) step, a symmetric motion vector difference (SMVD) step, a subblock transform (SBT) step, or a triangle prediction step.

31. The method of clause 30, wherein the at least one interpolation filter corresponds to a default filter.

32. The method of any of clauses 30-31, wherein disabling the one or more video processing steps include disabling, in the bitstream representation, an indication of the one or more video processing steps.

33. The method of any of clauses 30-31, wherein disabling the one or more video processing steps include disabling inheritance of the at least one interpolation filter of the current video block to another video block.

34. The method of clause 1, wherein the integer pixel accuracy of the single set of motion information corresponds to 1 pixel, 2 pixels, or 4 pixels.

35. The method of clause 34, wherein the at least one interpolation filter is a low-pass filter.

36. The method of clause 34, wherein the at least one interpolation filter is a one-dimensional filter.

37. The method of clause 36, wherein the one-dimensional filter is a horizontal filter or a vertical filter.

38. The method of clause 34, wherein a flag in the bitstream representation indicates whether the at least one interpolation filter is employed or not.

39. The method of any of clauses 1-38, wherein the current video block is associated with an adaptive motion vector resolution (AMVR) mode.

40. The method of any of clauses 1-39, wherein the at least one interpolation filter for an inter mode of the current video block is different from a generalized bi-prediction (GBI) mode of the current video block.

41. The method of any of clauses 1-40, wherein the at least one interpolation filter is pre-determined.

42. The method of any of clauses 1-41, wherein the bitstream representation includes a video parameter set (VPS), a picture parameter set (PPS), a picture header, a tile group header, or a slice header associated with the current video block.

43. The method of any one or more of clauses 1 through 42, wherein the video processing is an encoder-side implementation.

44. The method of any one or more of clauses 1 through 70, wherein the video processing is a decoder-side implementation.

45. An apparatus in a video system comprising a processor and a non-transitory memory with instructions thereon, wherein the instructions upon execution by the processor, cause the processor to implement the method in any of clauses 1 to 44.

46. A computer program product stored on a non-transitory computer readable media, the computer program product including program code for carrying out the method in any one or more of clauses 1 to 45.

The second set of clauses describe certain features and aspects of the disclosed techniques listed in the previous section, including, for example, Example Implementations 1, 8, and 10.

1. A video processing method, comprising: performing a conversion between a current video block of a video and a coded representation of the video, wherein the coded representation includes a first parameter that indicates a motion information precision from a multiple precision set for the current video block that does not use a default motion information precision and/or a second parameter which identifies whether an alternative half-pel interpolation filter is used for the conversion, and wherein each of the first parameter and/or the second parameter is associated with one or more bins and a context-model based coding is only used for a first bin of the one or more bins in the coded representation.

2. The method of clause 1, wherein the motion information comprises at least one of: motion vector prediction, motion vector difference and motion vector.

3. The method of clause 1, wherein the first parameter is amvr_precision_idx.

4. The method of clause 1, wherein the default motion information precision is ¼-luma sample.

5. The method of clause 1, wherein the multiple precision set comprises at least one of: 1/16-luma sample, ½-luma sample, 1 luma sample and 4 luma sample.

6. The method of clause 1, wherein the current block is coded in inter mode, affine inter mode or intra block copy mode.

7. The method of clause 1, wherein one context is used for the first bin of the first parameter.

8. The method of clause 1, wherein remaining bins are bypass-coded.

9. The method of clause 1, wherein the first bin of the first parameter and/or the first bin of the second parameter is bypass-coded.

10. The method of clause 1, wherein one context is used for the first bin of the second parameter.

11. The method of clause 1, wherein one context is shared by all bins of the first parameter.

12. The method of clause 1, wherein one context is shared by all bins of the second parameter.

13. The method of clause 1, wherein the second parameter has a first value that indicate use of a default half-pel interpolation filter.

14. The method of clause 1, wherein the second parameter has a second value that use of the alternative half-pel interpolation filter.

15. The method of clause 13, wherein the default half-pel interpolation filter has a coefficient set that is [−1, 4, −11, 40, 40, −11, 4, −1].

16. The method of clause 1, wherein the alternative half-pel interpolation filter has a coefficient set that is [0, 3, 9, 20, 20, 9, 3, 0].

17. A video processing method, comprising: determining, for a conversion between a current video block of a video and a coded representation of the video, motion information using an interpolation filter, the motion information having an M-integer pixel accuracy or a 1/N sub-pixel accuracy, where M and N are positive integers and N is unequal to 2; and performing the conversion based on the motion information; wherein a syntax field in the coded representation corresponds to the interpolation filter.

18. The method of clause 17, wherein N is equal to 4. Alternatively, in some embodiments N is equal to 16.

19. The method of clause 17, wherein, due to the current video block coded with an adaptive motion vector difference resolution (AMVR) mode, the coded representation includes an index of the interpolation filter.

20. The method of clause 17, wherein, due to the current video block coded with a merge mode and/or a merge with motion vector difference (MMVD) mode, an index of the interpolation filter is not inherited from a previous video block.

21. The method of clause 17, wherein, due to the current video block being coded with a merge mode and/or a merge with motion vector difference (MMVD) mode, the syntax field indicates a default interpolation filter.

22. The method of clause 17, wherein, for the current video block coded with a merge mode and/or a merge with motion vector difference (MMVD) mode, an index of the interpolation filter is inherited from a previous video block.

23. The method of clause 22, wherein the motion information has the sub-pixel accuracy.

24. The method of clause 22, wherein the motion information includes one or more components having the sub-pixel accuracy.

25. The method of clause 22, wherein an index of the interpolation filter is associated exclusively for the current video block and not associated for subsequent video blocks.

26. The method of clause 17, wherein M is equal to 1, 2 or 4.

27. The method of clause 17, wherein the interpolation filter is a low-pass filter.

28. The method of clause 17, wherein the interpolation filter is a one-dimensional filter.

29. The method of clause 28, wherein the one-dimensional filter is a horizontal filter or a vertical filter.

30. The method of clause 17, wherein the coded representation selectively includes a flag indicating whether the interpolation filter having M-integer pixel accuracy is enabled.

31. The method of clause 30, wherein the flag is signaled if and only if the current video block is encoded using an integer pixel motion vector precision.

32. The method of any of clauses 1 to 31, wherein the performing of the conversion includes generating the video from the coded representation.

33. The method of any of clauses 1 to 31, wherein the performing of the conversion includes generating the coded representation from the video.

34. An apparatus in a video system comprising a processor and a non-transitory memory with instructions thereon, wherein the instructions upon execution by the processor, cause the processor to implement the method in any one of clauses 1 to 33.

35. A computer program product stored on a non-transitory computer readable media, the computer program product including program code for carrying out the method in any one of clauses 1 to 34.

The third set of clauses describe certain features and aspects of the disclosed techniques listed in the previous section, including, for example, Example Implementations 2, 3, 5, and 6.

1. A video processing method, comprising: generating, for a conversion between a current video block of a video and a coded representation of the video, a first motion candidate based on one or more motion candidates in a motion candidate list and one or more interpolation filters associated with the one or more motion candidates; wherein an interpolation filter is assigned to the first motion candidate according to a rule that depends on the one or more interpolation filters associated with the one or more motion candidates, inserting the first motion candidate into the motion candidate list; and performing the conversion based on the motion candidate list.

2. The method of clause 1, wherein the first motion candidate corresponds to at least one of a pair-wise merge candidate, a combined merge candidate, a zero motion vector candidate, and/or other default candidates.

3. The method of clause 1, wherein each motion candidate is associated with a half-sample interpolation filter index and a half-sample interpolation filter of the first motion candidate is determined by half-sample interpolation filter indices of at least two motion candidates.

4. The method of clause 1, wherein, for two motion candidates being associated with a same half-sample interpolation filter, the rule specifies that the same half-sample interpolation filter is inherited in the first motion candidate.

5. The method of clause 4, wherein the same half-sample interpolation filter corresponds to an alternative half-sample interpolation filter associated with a half-sample interpolation filter index being equal to 1, the alternative half-sample interpolation filter different from a default half-sample interpolation filter associated with a half-sample interpolation filter index being equal to 0.

6. The method of clause 1, wherein, for one of the motion candidates not being associated with a default interpolation filter, the rule specifies that the interpolation filter is inherited in the first motion candidate.

7. The method of clause 6, wherein the interpolation filter is only used for a corresponding prediction direction.

8. The method of clause 1, wherein, for two motion candidates being associated with different interpolation filters, the rule specifies that the different interpolation filters are inherited in the first motion candidate.

9. The method of clause 1, wherein the different interpolation filters are used for different prediction directions.

10. The method of clause 1, wherein a number of the first motion candidate whose assigned interpolation filter corresponds to an alternative interpolation filter is not more than K, where K being equal to or greater than 0.

11. The method of clause 1, wherein a default interpolation filter is always used for the first motion candidate.

12. A video processing method, comprising: associating, with each of multiple blocks comprising a first block in a first video region and a second block in a second video region of a video, motion information that includes information about a respective interpolation filter used for interpolating motion vector difference information for each of the multiple blocks; and performing a conversion between the video and a coded representation of the video using the motion information.

13. The method of clause 12, wherein the motion information comprises information indicative of use of a default motion interpolation filter.

14. The method of clause 12, wherein the motion information identifies an alternative interpolation filter that is different from a default interpolation filter.

15. The method of clause 12, wherein the motion information includes one or more motion vectors and one or more reference frame indices.

16. The method of any of clauses 12 to 15, wherein the first video region and the second video region are coding tree unit rows.

17. The method of any of clause 12 to 15, wherein the first video region and the second video region are virtual pipeline data units.

18. The method of any of clauses 12 to 17, wherein the first video region and the second video region are different regions.

19. The method of any of clauses 12 to 18, wherein the second block is coded or decoded by accessing the first block and wherein the motion information is according to a rule that specifies that an interpolation filter used for the second block is disallowed to be same as an interpolation filter used for the first block in case that the first video region is different from the second video region.

20. The method of any of clauses 12 to 17, wherein the first video region and the second video region are same.

21. A video processing method, comprising: performing a conversion between a current video block of a video and a coded representation of the video, wherein the current video block is represented in the coded representation using a merge mode or a merge with motion vector different (MMVD) mode, wherein an interpolation filter having a 1/N precision is used for interpolating a prediction block associated with the current video block according to a rule, wherein N is a positive integer; wherein the rule defines a condition for inheriting interpolation information in case that the interpolation filter is an alternative interpolation filter that is different from a default interpolation filter.

22. The method of clause 21, wherein the rule determines to disallow the inheriting of coefficients of the alternative interpolation filter.

23. The method of clause 21, wherein a syntax element in the coded representation always indicates the default interpolation filter.

24. The method of clause 21, wherein the rule determines to allow the inheriting of coefficients of the alternative interpolation filter.

25. The method of clause 24, wherein the coefficients of the alternative interpolation filter are inherited when final derived motion vectors are of ½-pel precision and no motion vector component has a finer motion vector precision.

26. The method of clause 24, wherein the coefficients of the alternative interpolation filter are inherited when final derived motion vectors include one or more motion vector components that have ½-pel precision.

27. The method of clause 24, wherein the alternative interpolation filter is only used for motion compensation.

28. The method of clause 24, wherein an index of the default interpolation filter is stored for the current video block and used by coded blocks subsequent to the current video block.

29. A video processing method, comprising: processing a current video block during a conversion between a video comprising the current video block and a coded representation of the video; and comparing and selectively updating a merge candidate list with motion information of the current video block, wherein the motion information includes interpolation filter information; wherein the interpolation filter information includes parameters of an interpolation filter used for interpolating motion vector difference values used for representing the current video block in the coded representation.

30. The method of clause 29, wherein two merge candidates associated with different interpolation filters are considered as two different merge candidates.

31. The method of clause 29, wherein comparing and selectively updating the merge list includes inserting a history-based motion vector prediction (HMVP) merge candidate to the merge candidate list by considering the interpolation filter information.

32. The method of clause 29, wherein comparing and selectively updating the merge candidate list includes inserting a history-based motion vector prediction (HMVP) merge candidate to the merge candidate list by not considering the interpolation filter information.

33. The method of any of clauses 1 to 32, wherein the default motion interpolation filter has a coefficient set that is [−1, 4, −11, 40, 40, −11, 4, −1].

34. The method of any of clauses 1 to 32, wherein the alternative interpolation filter has a coefficient set that is [0, 3, 9, 20, 20, 9, 3, 0].

35. The method of any of clauses 1 to 34, wherein the performing of the conversion includes generating the coded representation from the current video block.

36. The method of any of clauses 1 to 34, wherein the performing of the conversion includes generating the current video block from the coded representation.

37. An apparatus in a video system comprising a processor and a non-transitory memory with instructions thereon, wherein the instructions upon execution by the processor, cause the processor to implement the method in any one of clauses 1 to 36.

38. A computer program product stored on a non-transitory computer readable media, the computer program product including program code for carrying out the method in any one of clauses 1 to 36.

The fourth set of clauses describe certain features and aspects of the disclosed techniques listed in the previous section, including, for example, Example Implementation 4.

1. A video processing method, comprising: maintaining, prior to a conversion between a current video block of a video region and a coded representation of the video, at least one history-based motion vector prediction (HMVP) table, wherein the HMVP table includes one or more entries corresponding to motion information of one or more previously processed blocks; and performing the conversion using the at least one HMVP table; and wherein the motion information of each entry is configured to include interpolation filter information for the one or more previously processed blocks, wherein the interpolation filter information indicates interpolation filters used for interpolating prediction blocks of the one or more previously processed blocks.

2. A video processing method, comprising: maintaining, prior to a conversion between a current video block of a video region and a coded representation of the video, at least one history-based motion vector prediction (HMVP) table that includes one or more entries corresponding to motion information of one or more previously processed blocks, and wherein the motion information of each entry is configured to include interpolation filter information for the one or more previously processed blocks; constructing, for the conversion, a motion candidate list which includes an HMVP merge candidate, wherein the HMVP candidate is derived by inheriting one entry from the HMVP table including corresponding interpolation filter information associated with the one entry; and performing the conversion based on the motion candidate list.

3. The method of clause 1 or 2, the method further comprises updating, selectively after the conversion, the HMVP table.

4. The method of clause 1 or 2, the method further comprises updating selectively the HMVP table using the motion information derived during the conversion for the current video block, wherein the motion information derived for the current video block includes interpolation filter information for the current video block.

5. The method of clause 3 or 4, wherein the updating includes determining whether to insert a new candidate into the HMVP table without considering the interpolation filter information.

6. The method of clause 4, wherein the new candidate and an entry in the HMVP table before being updated that have different interpolation filter information but same part or all of remaining motion information excluding the interpolation filter information are considered as a same candidate.

7. The method of clause 3 or 4, wherein the updating includes determining whether to insert a new candidate into the HMVP table by considering the interpolation filter information.

8. The method of clause 7, wherein the new candidate and an entry in the HMVP table before being updated that have same part or all of remaining motion information excluding the interpolation filter information are considered as two different candidates.

9. The method of any of clauses 5 to 8, wherein the new candidate is derived based on the motion information of the current video block;

10. The method of any of clauses 5 to 8, wherein the updating includes, for the new candidate that is different from an entry in the HMVP table, adding the new candidate to the HMVP table.

11. The method of any of clauses 5 to 8, wherein the updating includes, for the new candidate that is same as an entry in the HMVP table, removing the entry from the HMVP table and adding the new candidate to the HMVP table.

12. The method of any of clauses 1 to 11, wherein the interpolation filter information includes a half sample interpolation filter index that indicates use of an alternative interpolation filter or a default interpolation filter.

13. The method of clause 12, wherein the half sample interpolation filter index is equal to 0 to indicate the use of the default interpolation filter.

14. The method of clause 12, wherein the half sample interpolation filter index is equal to 1 to indicates the use of the alternative interpolation filter.

15. The method of clause 12, wherein the default interpolation filter has a coefficient set that is [−1, 4, −11, 40, 40, −11, 4, −1].

16. The method of clause 12, wherein the alternative interpolation filter has a coefficient set that is [0, 3, 9, 20, 20, 9, 3, 0].

17. The method of any of clauses 1 to 16, wherein performing of the conversion includes generating the coded representation from the current video block.

18. The method of any of clauses 1 to 16, wherein the performing of the conversion includes generating the current video block from the coded representation.

19. An apparatus in a video system comprising a processor and a non-transitory memory with instructions thereon, wherein the instructions upon execution by the processor, cause the processor to implement the method in any one of clauses 1 to 18.

20. A computer program product stored on a non-transitory computer readable media, the computer program product including program code for carrying out the method in any one of clauses 1 to 18.

The fifth set of clauses describe certain features and aspects of the disclosed techniques listed in the previous section, including, for example, Example Implementations 7 and 11-12.

1. A video encoding method, comprising: deciding a coding mode used for representing a current video block of a video in a coded representation of the video; and coding the current video block into the coded representation according to the coding mode, wherein use of half-pel accuracy for representing motion information is disabled for the current video block due to use of the coding mode.

2. A video decoding method, comprising: parsing a coded representation of a video to determine that a current video block of the video is coded using a coding mode; and generating a decoded representation of the current video block from the coded representation according to the coding mode, wherein use of half-pel accuracy for representing motion information is disabled for the current video block due to use of the coding mode.

3. The method of clause 1 or 2, wherein the motion information corresponds to one or more motion vectors for the current video block.

4. The method of clause 1 or 2, wherein the motion information corresponds to one or more motion vector difference values for the current video block.

5. The method of clause 1 or 2, wherein the motion information corresponds to one or more motion vectors for the current video block and one or more motion vector difference values for the current video block.

6. The method of any of clauses 1 to 4, wherein, due to use of the coding mode, the coded representation omits bits and/or bins for signaling whether half-pel resolution is applicable to the current video block.

7. The method of any of clauses 1 to 6, wherein the coding mode corresponds to an intra block copy (IBC) mode that generates a prediction block using at least a block vector pointing to a video frame containing the current video block for coding the current video block.

8. The method of clause 7, wherein an indication of a half-pel interpolation filter is not signaled.

9. The method of clause 1, wherein the coding mode corresponds to a mode in which the current video block is divided into two parts, each part is associated with one motion candidate and two motion candidates are derived from a same motion candidate list.

10. The method of clause 9, wherein the coding mode corresponds to a triangular prediction mode.

11. The method of clause 1, wherein the coding mode corresponds to a merge mode in which the current video block and neighboring blocks share the motion information.

12. A video processing method, comprising: determining, for a current video block that is processed using a generalized Bi-prediction (GBi) mode, to use a first weighting factor and a second, different weighting factor for a first prediction block and a second prediction block, respectively, the first weighting factor and the second weighting factor selected from weighting factor sets; and performing a conversion between the current video block of a video and a coded representation of the video using the final predictor, wherein a first weighting factor set used for an inter mode is different from a second weighting factor set used for an affine inter mode.

13. The method of clause 12, wherein a sum of the first weighting factor and the second weighting factor equals to 1.

14. The method of clause 12, wherein the weighing factor sets are signaled in a sequence parameter set (SPS), a video parameter set (VPS), a picture parameter set (PPS), a picture header, a tile group header, or a slice header associated with the current video block.

15. The method of clause 12, wherein the weighing factor sets are predefined.

16. A video processing method, comprising: determining, for a conversion between multiple video units of a video region of a video and a coded representation of the multiple video units, information related to an interpolation filter depending on a coding mode of a video unit, the interpolation filter used for interpolating motion vector difference values in the coded representation and having a M-integer pixel accuracy or a 1/N sub-pixel accuracy, where M and N are positive integers; and performing the conversion using the interpolation filter.

17. The method of clause 16, wherein determining determines a first set of coefficients of the interpolation filter for the video unit coded with an affine mode and wherein determining determined a different, second set of coefficients of the interpolation for another video unit coded with a non-affine mode.

18. The method of clause 16, wherein determining determines a first set of coefficients of the interpolation filter for the video unit coded with an IBC mode and wherein determining determined a different, second set of coefficients of the interpolation for another video unit coded with a non-IBC mode.

19. The method of any of clauses 1 to 18, wherein the performing of the conversion includes generating the coded representation from the current video block.

20. The method of any of clauses 1 to 18, wherein the performing of the conversion includes generating the current video block from the coded representation.

21. An apparatus in a video system comprising a processor and a non-transitory memory with instructions thereon, wherein the instructions upon execution by the processor, cause the processor to implement the method in any one of clauses 1 to 20.

22. A computer program product stored on a non-transitory computer readable media, the computer program product including program code for carrying out the method in any one of clauses 1 to 20.

The sixth set of clauses describe certain features and aspects of the disclosed techniques listed in the previous section, including, for example, Example Implementation 9.

1. A video encoding method, comprising: deciding a coding mode used for representing a current video block of a video in a coded representation of the video; and coding the current video block into the coded representation according to the coding mode, wherein use of alternative half-pel accuracy filters in addition to a default half-pel accuracy filter for representing motion information is disabled for the current video block due to use of the coding mode.

2. A video decoding method, comprising: parsing a coded representation of a video to determine that a current video block of the video is coded using a coding mode; and generating a decoded representation of the current video block from the coded representation according to the coding mode, wherein use of alternative half-pel accuracy filters in addition to a default half-pel accuracy filter for representing motion information is disabled for the current video block due to use of the coding mode.

3. The method of clause 1 or 2, wherein the coding mode corresponds to a triangle prediction mode in which the video block is partitioned into multiple partitions, at least one of which is a non-rectangular partition.

4. The method of clause 3, wherein information related to the alternative half-pel accuracy filter is not inherited in the triangle prediction mode and only the default half-pel accuracy filter is used.

5. The method of clause 1 or 2, wherein the coding mode corresponds to a bi-direction optical flow (BDOF) in which the current block is bi-directionally predicted.

6. The method of clause 1 or 2, wherein the coding mode corresponds to a decoder-side motion vector refinement (DMVR) that refines prediction information from motion information derived at a decoder side.

7. The method of clause 1 or 2, wherein the coding mode corresponds to a decoder-side motion vector derivation (DMVD) that derives motion information at a decoder side.

8. The method of clause 1 or 2, wherein the coding mode corresponds to a combined inter-intra prediction (CIIP) in which inter and intra prediction is combined to generate a final prediction signal.

9. The method of clause 1 or 2, wherein the coding mode corresponds to a SMVD (symmetric motion vector difference) that processes motion vector difference symmetrically.

10. The method of clause 1 or 2, wherein the coding mode corresponds to a SBT (subblock transform) that transforms a sub-block into a transform block.

11. A video encoding method, comprising: determining, due to use of an alternative interpolation filter being enabled for a video block of a video, that a coding mode is disallowed for coding the video block into a coded representation of the video; and generating the coded representation of the video block based on the determining, wherein the alternative interpolation filter is used for interpolating inter prediction blocks of the current video block.

12. A video decoding method, comprising: determining, due to use of an alternative interpolation filter being enabled for a video block of a video, that use of a coding mode for representing the video block in a coded representation of the video is disallowed; and generating a decoded video block by parsing the coded representation based on the determining.

13. The method of clause 11 or 12, wherein the alternative interpolation filter is an alternative half-sample interpolation filter.

14. The method of clause 11, wherein the determining determines to disallow the coding mode corresponding to a coding mode in which the current video block is divided into two parts, each part is associated with one motion candidate and two motion candidates are derived from a same motion candidate list.

15. The method of clause 14, wherein the coding mode corresponds to a triangle prediction mode.

16. The method of clause 13 or 14, wherein information related to the alternative interpolation filter is not inherited in the coding mode and only a default half-sample interpolation filter is used.

17. The method of clause 11 or 12, wherein the determining determines to disallow the coding mode corresponding to a bi-direction optical flow (BDOF) in which the current block is bi-directionally predicted.

18. The method of clause 17, wherein the determining determines to disallow the coding mode corresponding to a decoder-side motion vector refinement (DMVR) that refines prediction information from motion information derived at a decoder side.

19. The method of clause 12, wherein the determining determines to disallow the coding mode corresponding to a decoder-side motion vector derivation (DMVD) that derives motion information at a decoder side.

20. The method of clause 11, wherein the determining determines to disallow the coding mode corresponding to a combined inter-intra prediction (CIIP) in which inter and intra prediction is combined to generate a final prediction signal.

21. The method of clause 20, wherein a CIIP flag is skipped and inferred to be false in case that a merge candidate inherits the interpolation filter.

22. The method of clause 20, wherein a default interpolation filter is always used in case that a CIIP flag is true.

23. The method of clause 11, wherein the determining determines to disallow the coding mode corresponding to a SMVD (symmetric motion vector difference) that processes motion vector difference symmetrically.

24. The method of clause 23, wherein a default interpolation filter is always used for the usage of the SMVD and wherein a syntax element related to the interpolation filter is not signaled.

25. The method of clause 23, wherein a syntax element related to the interpolation filter indicates that the interpolation filter is not used, a syntax element related to the SMVD is not signaled, and the SMVD is not used.

26. The method of clause 12, wherein the determining determines to disallow the coding mode corresponding to a SBT (subblock transform) that transforms a sub-block into a transform block.

27. The method of clause 26, wherein a default interpolation filter is always used for the usage of the SBT and a syntax element related to the interpolation filter is not signaled.

28. The method of clause 26, wherein a syntax element related to the interpolation filter indicates that the interpolation filter is not used, a syntax element related to the SBT is not signaled, and the SBT is not used.

29. The method of clause 11, wherein the generating the coded representation includes generating the coded representation by coding the video block using a triangle coding mode in which the video block is partitioned into multiple partitions, at least one of which is a non-rectangular partition.

30. The method of clause 29, wherein information related to the interpolation filter is inherited in the triangle coding mode.

31. The method of clause 11, wherein the generating the coded representation includes generating the coded representation by omitting syntax elements that signal use of the coding mode.

32. The method of clause 12, wherein the parsing the coded representation includes parsing the coded representation in absence of syntax elements that signal use of the coding mode.

33. An apparatus in a video system comprising a processor and a non-transitory memory with instructions thereon, wherein the instructions upon execution by the processor, cause the processor to implement the method in any one of clauses 1 to 32.

34. A computer program product stored on a non-transitory computer readable media, the computer program product including program code for carrying out the method in any one of clauses 1 to 32.

In some embodiments, the above-disclosed methods may be implemented by an apparatus that comprises a processor that is configurable to perform the method.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent documents.

What is claimed is:

1. A method of processing video data, comprising:
performing a conversion between a current video block of a video and a bitstream of the video,
wherein the bitstream at least includes a parameter which indicates a motion information precision from a multiple precision set for the current video block, and
wherein the parameter which indicates the motion information precision from the multiple precision set for the current video block is associated with one or more bins and a context-model based coding is only used for a first bin of the one or more bins, wherein one context is used for a first bin of the parameter, wherein the method further comprises:
maintaining, prior to the conversion between the current video block and the bitstream, at least one history-based motion vector prediction (HMVP) table that includes one or more entries corresponding to motion information of one or more previously processed blocks, and wherein each entry is further configured to include interpolation filter information for the one or more previously processed blocks, wherein the interpolation filter information indicates at least one interpolation filter used for prediction blocks of the one or more previously processed block;
constructing, for the conversion, a motion candidate list which includes an HMVP candidate, wherein the HMVP candidate is derived by inheriting one entry from the HMVP table, wherein the inheriting comprises inheriting the interpolation filter information associated with the one entry.

2. The method of claim 1, wherein the parameter is amvr_precision_idx.

3. The method of claim 1, wherein maintaining the at least one HMVP table comprising:
selectively updating the at least one HMVP table by inserting a new candidate into the at least one HMVP table,
wherein the new candidate is determined to be a same candidate as one candidate corresponding to one entry from the HMVP table in response to the new candidate and the one candidate being of same motion information but different interpolation filter information.

4. The method of claim 1, wherein the motion candidate list includes one or more first motion candidates and a second motion candidate which is derived from the one or more first motion candidates that have been added into the motion candidate list,
wherein second interpolation filter information assigned to the second motion candidate is generated based on first interpolation filter information assigned to the one or more first motion candidates.

5. The method of claim 4, wherein the second motion candidate is a pairwise-average merging candidate.

6. The method of claim 5, wherein the second motion candidate is added into the motion candidate list after the one or more first motion candidates.

7. The method of claim 5, wherein the one or more first motion candidates comprises the HMVP candidate.

8. The method of claim 5, wherein the first interpolation filter information and the second interpolation filter information are associated with half-sample interpolation filter indices.

9. The method of claim 1, wherein the conversion comprises encoding the current block into the bitstream.

10. The method of claim 1, wherein the conversion comprises decoding the current block from the bitstream.

11. An apparatus for processing video data comprising a processor and a non-transitory memory with instructions thereon, wherein the instructions upon execution by the processor, cause the processor to:
perform a conversion between a current video block of a video and a bitstream of the video,
wherein the bitstream at least includes a parameter which indicates a motion information precision from a multiple precision set for the current video block, and
wherein the parameter which indicates the motion information precision from the multiple precision set for the current video block is associated with one or more bins and a context-model based coding is only used for a first bin of the one or more bins, wherein one context is used for a first bin of the parameter, wherein the instructions further cause the processor to:
maintain, prior to the conversion between the current video block and the bitstream, at least one history-based motion vector prediction (HMVP) table that includes one or more entries corresponding to motion information of one or more previously processed blocks, and wherein each entry is further configured to include interpolation filter information for the one or more previously processed blocks, wherein the interpolation filter information indicates at least one interpolation filter used for prediction blocks of the one or more previously processed block;
construct, for the conversion, a motion candidate list which includes an HMVP candidate, wherein the HMVP candidate is derived by inheriting one entry from the HMVP table, wherein the inheriting comprises inheriting the interpolation filter information associated with the one entry.

12. The apparatus of claim 11, wherein the parameter is amvr_precision_idx.

13. A non-transitory computer-readable storage medium storing instructions that cause a processor to:
perform a conversion between a current video block of a video and a bitstream of the video,
wherein the bitstream at least includes one of a parameter which indicates a motion information precision from a multiple precision set for the current video block, and
wherein the parameter which indicates the motion information precision from the multiple precision set for the current video block is associated with one or more bins and a context-model based coding is only used for a first bin of the one or more bins, wherein one context is used for a first bin of the parameter, wherein the instructions further cause the processor to:
maintain, prior to the conversion between the current video block and the bitstream, at least one history-based motion vector prediction (HMVP) table that includes one or more entries corresponding to motion information of one or more previously processed blocks, and wherein each entry is further configured to include interpolation filter information for the one or more previously processed blocks, wherein the interpolation filter information indicates at least one interpolation filter used for prediction blocks of the one or more previously processed block;

construct, for the conversion, a motion candidate list which includes an HMVP candidate, wherein the HMVP candidate is derived by inheriting one entry from the HMVP table, wherein the inheriting comprises inheriting the interpolation filter information associated with the one entry.

14. The non-transitory computer-readable storage medium of claim 13, wherein the parameter is amvr_precision_idx.

15. A non-transitory computer-readable recording medium storing a bitstream which is generated by a method performed by a video processing apparatus, wherein the method comprises:

generating the bitstream from a current video block of a video, wherein the bitstream at least includes a parameter which indicates a motion information precision from a multiple precision set for the current video block, and wherein the parameter which indicates the motion information precision from the multiple precision set for the current video block is associated with one or more bins and a context-model based coding is only used for a first bin of the one or more bins, wherein one context is used for a first bin of the parameter, wherein the method further comprises:

maintaining, prior to generating the bitstream, at least one history-based motion vector prediction (HMVP) table that includes one or more entries corresponding to motion information of one or more previously processed blocks, and wherein each entry is further configured to include interpolation filter information for the one or more previously processed blocks, wherein the interpolation filter information indicates at least one interpolation filter used for prediction blocks of the one or more previously processed block;

constructing, for generating the bitstream, a motion candidate list which includes an HMVP candidate, wherein the HMVP candidate is derived by inheriting one entry from the HMVP table, wherein the inheriting comprises inheriting the interpolation filter information associated with the one entry.

16. The apparatus of claim 11, wherein maintaining the at least one HMVP table comprising:

selectively updating the at least one HMVP table by inserting a new candidate into the at least one HMVP table, wherein the new candidate is determined to be a same candidate as one candidate corresponding to one entry from the HMVP table in response to the new candidate and the one candidate being of same motion information but different interpolation filter information.

17. The apparatus of claim 11, wherein the motion candidate list includes one or more first motion candidates and a second motion candidate which is derived from the one or more first motion candidates that have been added into the motion candidate list, wherein second interpolation filter information assigned to the second motion candidate is generated based on first interpolation filter information assigned to the one or more first motion candidates.

18. The apparatus of claim 17, wherein the second motion candidate is a pairwise-average merging candidate.

19. The non-transitory computer-readable storage medium of claim 13, wherein maintaining the at least one HMVP table comprising:

selectively updating the at least one HMVP table by inserting a new candidate into the at least one HMVP table, wherein the new candidate is determined to be a same candidate as one candidate corresponding to one entry from the HMVP table in response to the new candidate and the one candidate being of same motion information but different interpolation filter information.

20. The non-transitory computer-readable recording medium of claim 15, wherein maintaining the at least one HMVP table comprising:

selectively updating the at least one HMVP table by inserting a new candidate into the at least one HMVP table, wherein the new candidate is determined to be a same candidate as one candidate corresponding to one entry from the HMVP table in response to the new candidate and the one candidate being of same motion information but different interpolation filter information.

* * * * *